US012722640B2

(12) United States Patent
Furukawa et al.

(10) Patent No.: US 12,722,640 B2
(45) Date of Patent: Sep. 1, 2026

(54) VEHICLE CONTROL DEVICE, CONTROL METHOD, AND COMPUTER READABLE MEDIUM STORING CONTROL PROGRAM

(71) Applicant: HONDA MOTOR CO., LTD., Tokyo (JP)

(72) Inventors: Takuya Furukawa, Tokyo (JP); Yuki Kizumi, Tokyo (JP); Ryo Ushiki, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 19/066,173

(22) Filed: Feb. 28, 2025

(65) Prior Publication Data

US 2025/0304075 A1 Oct. 2, 2025

(30) Foreign Application Priority Data

Mar. 28, 2024 (JP) ................................ 2024-053760

(51) Int. Cl.
*B60W 40/02* (2006.01)
*B60W 30/095* (2012.01)

(52) U.S. Cl.
CPC ......... *B60W 40/02* (2013.01); *B60W 30/0956* (2013.01); *B60W 2420/403* (2013.01);
(Continued)

(58) Field of Classification Search
CPC ............. B60W 40/02; B60W 30/0956; B60W 2556/40; B60W 2552/53;
(Continued)

(56) References Cited

U.S. PATENT DOCUMENTS

2015/0353078 A1* 12/2015 Kaminade ............. B60W 30/00 701/1
2019/0156677 A1* 5/2019 Nishimura ............... G08G 1/04
(Continued)

FOREIGN PATENT DOCUMENTS

CN 100425486 C * 10/2008 ............ B60W 40/02
CN 101500865 B * 4/2012 ................ B60T 7/22
(Continued)

OTHER PUBLICATIONS

English Translation of CN-100425486-C (Year: 2008).*
(Continued)

*Primary Examiner* — Fadey S. Jabr
(74) *Attorney, Agent, or Firm* — Paratus Law Group, PLLC

(57) ABSTRACT

A vehicle control device for controlling a vehicle, includes: a first recognition unit configured to recognize a surrounding situation of the vehicle; a second recognition unit configured to, in a case where a shielding object present in front of the vehicle is recognized by the first recognition unit, recognize a shielding area shielded by the shielding object; a determination unit configured to determine an attribute of the shielding object; a setting unit configured to, based on a recognition result of the second recognition unit and a determination result of the determination unit, set the shielding area and a predetermined processing target area to a front image of the vehicle; a calculation unit configured to calculate a risk degree corresponding to the shielding object based on a size of an overlapping area between the shielding area and the processing target area; and a vehicle control unit, as defined herein.

13 Claims, 13 Drawing Sheets

(52) U.S. Cl.
CPC . *B60W 2552/53* (2020.02); *B60W 2554/4041* (2020.02); *B60W 2554/802* (2020.02); *B60W 2556/40* (2020.02)

(58) Field of Classification Search
CPC ... B60W 2554/4041; B60W 2554/802; B60W 2420/403
See application file for complete search history.

(56) References Cited

U.S. PATENT DOCUMENTS

| | | | | |
|---|---|---|---|---|
| 2020/0133266 | A1* | 4/2020 | Raichelgauz | G06V 20/597 |
| 2021/0039636 | A1* | 2/2021 | Kamiya | B60W 40/105 |
| 2021/0300362 | A1* | 9/2021 | Yasui | B60W 10/20 |
| 2021/0331673 | A1 | 10/2021 | Zhang et al. | |
| 2022/0289189 | A1* | 9/2022 | Komuro | B60W 30/18145 |

FOREIGN PATENT DOCUMENTS

| | | | | | |
|---|---|---|---|---|---|
| CN | 103727879 | A | * | 4/2014 | G06V 20/56 |
| CN | 111186437 | A | * | 5/2020 | B60W 30/0953 |
| CN | 113492845 | A | * | 10/2021 | G06V 10/803 |
| JP | 7341208 | B2 | | 9/2023 | |
| WO | WO-2020166338 | A1 | * | 8/2020 | B60W 50/00 |
| WO | WO-2020173325 | A1 | * | 9/2020 | B60W 30/0956 |
| WO | WO-2022097365 | A1 | * | 5/2022 | G06V 10/267 |

OTHER PUBLICATIONS

English Translation of CN-103727879-A (Year: 2014).*
English Translation of CN-111186437-A (Year: 2020).*
English Translation of CN-113492845-A (Year: 2021).*
English Translation of WO-2022097365-A1 (Year: 2022).*
English Translation of WO-2020166338-A1 (Year: 2020).*
English Translation of WO-2020173325-A1 (Year: 2020).*
English Translation of CN101500865 (Year: 2012).*

* cited by examiner

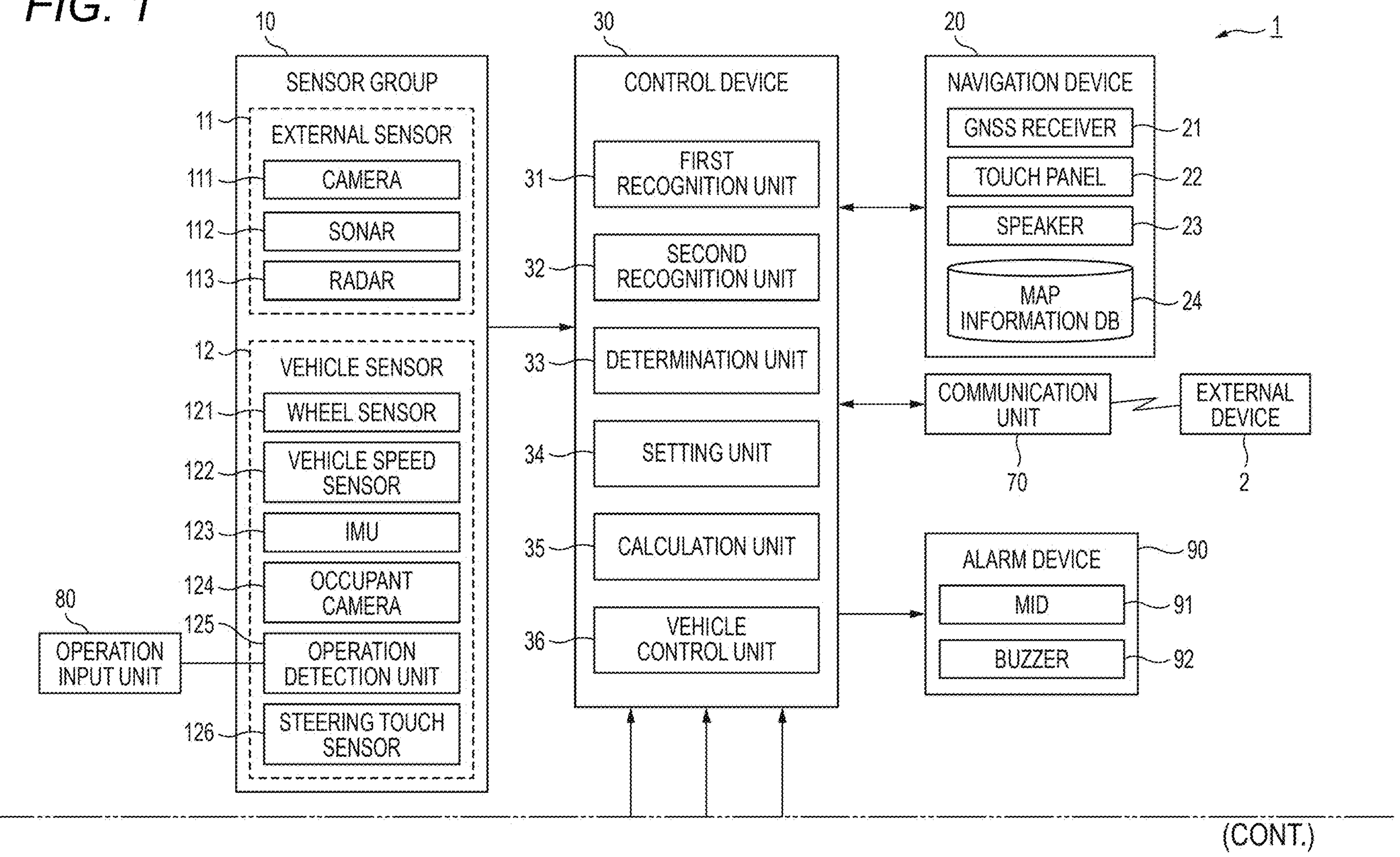
FIG. 1
1
SENSOR GROUP
10
EXTERNAL SENSOR
11
CAMERA
111
SONAR
112
RADAR
113
VEHICLE SENSOR
12
WHEEL SENSOR
121
VEHICLE SPEED SENSOR
122
IMU
123
OCCUPANT CAMERA
124
OPERATION DETECTION UNIT
125
STEERING TOUCH SENSOR
126
OPERATION INPUT UNIT
80
CONTROL DEVICE
30
FIRST RECOGNITION UNIT
31
SECOND RECOGNITION UNIT
32
DETERMINATION UNIT
33
SETTING UNIT
34
CALCULATION UNIT
35
VEHICLE CONTROL UNIT
36
NAVIGATION DEVICE
20
GNSS RECEIVER
21
TOUCH PANEL
22
SPEAKER
23
MAP INFORMATION DB
24
COMMUNICATION UNIT
70
EXTERNAL DEVICE
2
ALARM DEVICE
90
MID
91
BUZZER
92
(CONT.)

(FIG. 1 CONTINUED)

VEHICLE CONTROL DEVICE, CONTROL METHOD, AND COMPUTER READABLE MEDIUM STORING CONTROL PROGRAM

CROSS-REFERENCE TO RELATED APPLICATION

This application is based on and claims priority under 35 USC 119 from Japanese Patent Application No. 2024-053760 filed on Mar. 28, 2024.

TECHNICAL FIELD

The present invention relates to a vehicle control device, a control method, and a computer readable medium storing a control program for controlling a vehicle.

BACKGROUND ART

In recent years, active efforts have been made to provide access to a sustainable transportation system in consideration of vulnerable traffic participants. As one of these efforts, research and development on driving assist techniques and automated driving techniques for vehicles such as automobiles have been made in order to further improve safety and convenience of traffic.

As an example of a driving assist technique, Patent Literature 1 below discloses a technique of: when detecting a shielding object while a vehicle is traveling, determining a sudden braking speed limit point and a potential collision point according to a planned route of the vehicle and position information on the shielding object; calculating a speed limit value of the sudden braking speed limit point according to a distance between the sudden braking speed limit point and the potential collision point; and controlling the vehicle to travel at a planned speed at the sudden braking speed limit point if the planned speed is the speed limit braking value or less.

PATENT LITERATURE

Patent Literature 1: JP7341208B2

SUMMARY OF INVENTION

However, it was difficult, in the conventional art, to calculate an appropriate risk degree according to the surrounding situation of the host vehicle using a front image of the host vehicle.

The present invention provides a vehicle control device, a control method, and a computer readable medium storing a control program capable of calculating an appropriate risk degree according to a surrounding situation of a host vehicle using a front image of the host vehicle. In addition, this improves traffic safety and contributes to development of a sustainable transportation system.

An aspect of the present invention is a vehicle control device for controlling a vehicle, including:

- a first recognition unit configured to recognize a surrounding situation of the vehicle based on information obtained by an external sensor including a camera configured to image at least the front of the vehicle;
- a second recognition unit configured to, if a shielding object present in front of the vehicle is recognized by the first recognition unit, recognize a shielding area shielded by the shielding object;
- a determination unit configured to determine an attribute of the shielding object based on a recognition result of the first recognition unit;
- a setting unit configured to, based on a recognition result of the second recognition unit and a determination result of the determination unit, set the shielding area and a predetermined processing target area with respect to a front image of the vehicle obtained based on an imaging result of the camera;
- a calculation unit configured to calculate a risk degree corresponding to the shielding object based on a size of an overlapping area of the shielding area and the processing target area set by the setting unit; and
- a vehicle control unit configured to control the vehicle based on the risk degree calculated by the calculation unit, in which
- if the shielding object is determined as a crossing road shielding object that shields at least a part of a crossing road that is a road crossing a travel path on which the vehicle travels in front of the vehicle, the setting unit
  - sets as the processing target area, in the front image, an area extending toward the crossing road shielding object along a first direction corresponding to a width direction of the vehicle with reference to a virtual collision point between the vehicle and a moving object that may enter the travel path at a first speed from the crossing road on a side closer to the crossing road shielding object, and
  - sets a length of the processing target area in the first direction to a length corresponding to a distance corresponding to the first speed and a braking time when the vehicle is decelerated at a predetermined deceleration.

Another aspect of the present invention is a control method of a computer for controlling a vehicle performing processing including:

- recognizing a surrounding situation of the vehicle based on information obtained by an external sensor including a camera configured to image at least the front of the vehicle;
- if a shielding object present in front of the vehicle is recognized, recognizing a shielding area shielded by the shielding object;
- determining an attribute of the shielding object based on a recognition result of the surrounding situation;
- based on a recognition result of the shielding area and a determination result of the attribute of the shielding object, setting the shielding area and a predetermined processing target area with respect to a front image of the vehicle obtained based on an imaging result of the camera;
- calculating a risk degree corresponding to the shielding object based on a size of an overlapping area of the shielding area and the processing target area which had been set; and
- controlling the vehicle based on the risk degree, in which
- the processing of setting the processing target area includes: if the shielding object is determined as a crossing road shielding object that shields at least a part of a crossing road that is a road crossing a travel path on which the vehicle travels in front of the vehicle,
  - setting as the processing target area, in the front image, an area extending toward the crossing road shielding object along a first direction corresponding to a width direction of the vehicle with reference to a virtual collision point between the vehicle and a moving object that may enter the travel path at a first speed from the crossing road on a side closer to the crossing road shielding object, and setting a length of the processing target area in the first direction to a length corresponding to a distance corresponding to the first speed and a braking time when the vehicle is decelerated at a predetermined deceleration.

Another aspect of the present invention is a computer readable medium storing a control program for causing a computer for controlling a vehicle to perform processing including:

recognizing a surrounding situation of the vehicle based on information obtained by an external sensor including a camera configured to image at least the front of the vehicle;

if a shielding object present in front of the vehicle is recognized, recognizing a shielding area shielded by the shielding object;

determining an attribute of the shielding object based on a recognition result of the surrounding situation;

based on a recognition result of the shielding area and a determination result of the attribute of the shielding object, setting the shielding area and a predetermined processing target area with respect to a front image of the vehicle obtained based on an imaging result of the camera;

calculating a risk degree corresponding to the shielding object based on a size of an overlapping area of the shielding area and the processing target area which had been set; and controlling the vehicle based on the risk degree, in which the processing of setting the processing target area includes: if the shielding object is determined as a crossing road shielding object that shields at least a part of a crossing road that is a road crossing a travel path on which the vehicle travels in front of the vehicle, setting as the processing target area, in the front image, an area extending toward the crossing road shielding object along a first direction corresponding to a width direction of the vehicle with reference to a virtual collision point between the vehicle and a moving object that may enter the travel path at a first speed from the crossing road on a side closer to the crossing road shielding object, and setting a length of the processing target area in the first direction to a length corresponding to a distance corresponding to the first speed and a braking time when the vehicle is decelerated at a predetermined deceleration.

According to the present invention, it is possible to provide a vehicle control device, a control method, and a computer readable medium storing a control program capable of calculating an appropriate risk degree according to a surrounding situation of a host vehicle using a front image of the host vehicle.

DETAILED DESCRIPTION OF THE INVENTION

Hereinafter, an embodiment of a vehicle control device, a control method, and a control program of the present invention will be described with reference to the drawings. The drawings are viewed in directions of reference signs. The following embodiment does not limit the present invention, and not all elements described in the following embodiment are essential to the present invention. Further, two or more elements described in the following embodiment may be freely combined without departing from the gist of the present invention. Hereinafter, the same or similar elements are denoted by the same or similar reference signs, and description thereof may be omitted or simplified.

In addition, in the present specification, in order to simplify and clarify the description, the directions including front and rear (including front and back), left and right, up and down directions are described in accordance with a direction viewed from a driver who is an occupant of a vehicle (that is, vehicle 1 to be described later) controlled by a control device (that is, the control device 30 described later) which is an embodiment of the vehicle control device of the present invention, unless otherwise specified.

1. Vehicle

Figure 1:
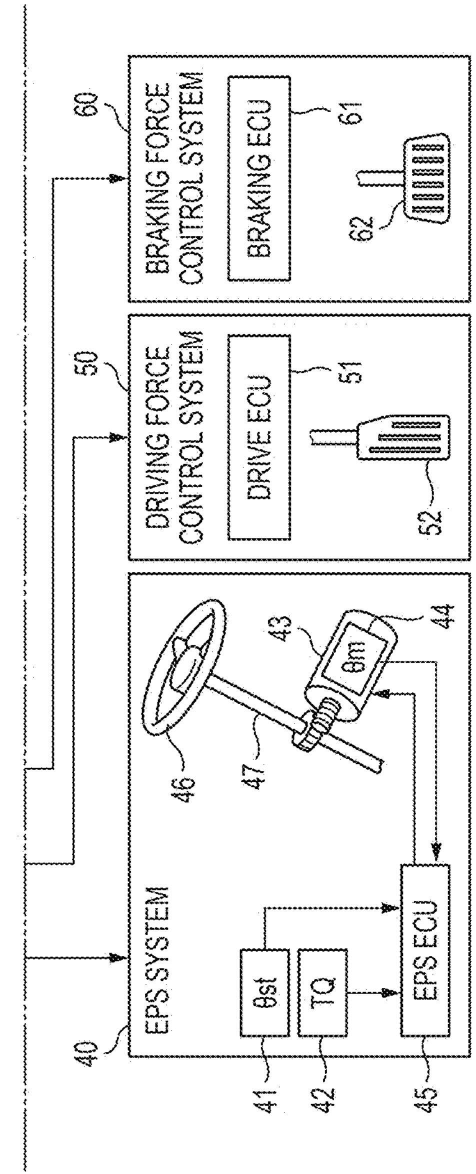
FIG. 1 is a block diagram illustrating a schematic configuration of a vehicle 1 including a control device 30 that is an embodiment of a vehicle control device of the present invention.

FIG. 1 is a block diagram illustrating a schematic configuration of a vehicle 1 including a control device 30 that is an embodiment of a vehicle control device of the present invention. A vehicle 1 according to the present embodiment illustrated in FIG. 1 is an automobile including a drive source (not illustrated), and wheels (not illustrated) including drive wheels driven by power of the drive source and steered wheels that are steerable. As an example, the vehicle 1 may be a four-wheeled automobile having a pair of left and right front wheels and a pair of left and right rear wheels.

The drive source of the vehicle 1 may be an electric motor, an internal combustion engine such as a gasoline engine or a diesel engine, or a combination of an electric motor and an internal combustion engine. The drive source of the vehicle 1 may drive the pair of left and right front wheels, the pair of left and right rear wheels, or the four wheels including the pair of left and right front wheels and the pair of left and right rear wheels. The front wheels and the rear wheels of the vehicle 1 may all be steerable steered wheels, or the front wheels or the rear wheels may be steerable steered wheels.

The vehicle 1 includes a sensor group 10, a navigation device 20, a control device 30 that is an example of the vehicle control device of the present invention, an electric power steering (EPS) system 40, a driving force control system 50, a braking force control system 60, a communication unit 70, an operation input unit 80, and an alarm device 90.

The sensor group 10 includes an external sensor 11 that acquires information on the surrounding of the vehicle 1 (hereinafter also referred to as “peripheral information”), and a vehicle sensor 12 that acquires information on the vehicle 1 (hereinafter also referred to as “vehicle information”). Information (in other words, detection values) acquired by each sensor in the sensor group 10 is output to the control device 30, and is used for control of the vehicle 1 (hereinafter, also referred to as “vehicle control”) performed by the control device 30.

The external sensor 11 includes, for example, a camera 111, a sonar 112, and a radar 113. The camera 111 is an imaging device that images the surroundings of the vehicle 1 including the front of the vehicle 1 and outputs image data of an obtained peripheral image to the control device 30. As the camera 111, for example, a digital camera using an imaging element such as a charge coupled device (CCD) or a complementary metal oxide semiconductor (CMOS) can be adopted.

The sonar 112 emits sound waves to the surrounding of the vehicle 1 (for example, the front, the rear, and lateral sides of the vehicle 1), and receives reflected sounds from an object present around the vehicle 1, thereby detecting a distance to the object, an azimuth of the object, and the like. The radar 113 emits radio waves to the surrounding of the vehicle 1 including the front of the vehicle 1, and receives reflected waves from an object present around the vehicle 1, thereby detecting a distance to the object, an azimuth of the object, and the like. As the radar 113, for example, a millimeter wave radar can be adopted.

The external sensor 11 may include light detection and ranging (LiDAR) instead of or in addition to the sonar 112 and the radar 113. In this case, the LiDAR emits laser light around the vehicle 1 including the front of the vehicle 1, and receives reflected light from an object present around the vehicle 1, thereby detecting a distance to the object, a direction of the object, and the like.

The vehicle sensor 12 includes, for example, a wheel sensor 121, a vehicle speed sensor 122, an inertial measurement unit (IMU) 123, an occupant camera 124, an operation detection unit 125, and a steering touch sensor 126.

The wheel sensor 121 detects a rotation angle of one or more wheels among the wheels of the vehicle 1. As an example, the wheel sensor 121 detects rotation angles of a left rear wheel and a right rear wheel. As the wheel sensor 121, for example, an angle sensor or a displacement sensor can be adopted.

The vehicle speed sensor 122 detects a vehicle speed VP that is a travel speed of the vehicle 1 (in other words, a movement speed of a vehicle body). For example, the vehicle speed sensor 122 detects the vehicle speed VP based on a rotation speed of a counter shaft (not illustrated) provided in the vehicle 1.

The inertial measurement unit 123 detects angular velocities of the vehicle 1 in a pitch direction, a roll direction, and a yaw direction, and accelerations of the vehicle 1 in a front-rear direction, a left-right direction, and an upper-lower direction. The vehicle sensor 12 may include, instead of the inertial measurement unit 123, an acceleration sensor that detects an acceleration of the vehicle 1 in a predetermined direction and a gyro sensor that detects an angular velocity of the vehicle 1 in a predetermined direction.

The occupant camera 124 is a digital camera that images the interior of the vehicle 1 and outputs image data of the obtained interior image to the control device 30. For example, the occupant camera 124 may be a so-called “driver monitor camera” that is capable of imaging the head of an occupant who sits on the driver’s seat of the vehicle 1 (hereinafter, also referred to as a “driver”) from the front (in other words, imaging the face). Similarly to the camera 111, a digital camera using an imaging element such as a CCD or a CMOS can be employed as the occupant camera 124.

The operation detection unit 125 detects an operation performed by using the operation input unit 80 that is operable by the driver. The operation input unit 80 can include, for example, an operation button (not illustrated) for receiving an operation to switch between on (in other words, operation) and off (in other words, non-operation) of predetermined driving assist control. In this case, the operation detection unit 125 can detect an operation of turning on or off the predetermined driving assist control. Here, the predetermined driving assist control may be, for example, collision reduction control performed by a vehicle control unit 36 described later.

The steering touch sensor 126 detects whether a steering 46 of the vehicle 1 is gripped appropriately. For example, the steering touch sensor 126 is implemented by a capacitance sensor or the like. In this case, the capacitance sensor is provided at a portion touched by the driver when the steering 46 is gripped appropriately.

The navigation device 20 includes, for example, a global navigation satellite system (GNSS) receiver 21, a touch panel 22, and a speaker 23. The navigation device 20 includes a storage unit (not illustrated) implemented by a flash memory or the like. The storage unit of the navigation device 20 stores a map information database (DB) 24 as an example of map information and the like.

The map information database 24 includes road network information. The road network information is information representing roads based on a combination of nodes and links connecting the nodes (also referred to as “paths”). Each node in the road network information represents, for example, a feature point on a road such as an intersection, a corner, or a dead end. In the road network information, each node is set with, for example, information indicating a location corresponding to the node (for example, coordinates that enable the identification of one point on a map such as latitude and longitude). In addition, in the road network information, each link is set with information indicating nodes at both ends of the link, a road corresponding to the link, a link length, a lane number, a traveling direction, a road type, and the like.

The GNSS receiver 21 identifies a current position of the vehicle 1 (for example, a latitude and a longitude of a location where the vehicle 1 is located) based on a signals received from a GNSS satellite. For example, the navigation device 20 may acquire a detection result of the vehicle sensor 12 (for example, the wheel sensor 121 or the vehicle speed sensor 122) via the control device 30 or the like, and identify or complement the current position of the vehicle 1 by an inertial navigation system (INS) using a detection value of the vehicle sensor 12.

The touch panel 22 is implemented by combining a display device such as a liquid crystal display or an organic light emitting diode (OLED) with a pointing device (for example, touch pad). The speaker 23 is configured to output sound to an occupant (for example, a driver) of the vehicle 1.

For example, the navigation device 20 searches for a route from a current position of the vehicle 1 to a destination set by the driver using the touch panel 22 by referring to the map information database 24. Then, the navigation device 20 performs route guidance using the touch panel 22 and the speaker 23 based on the route searched for. The navigation device 20 may cause the touch panel 22 to perform a predetermined display according to an instruction from the control device 30. Further, the navigation device 20 may output, to the control device 30, information indicating the identified current position of the vehicle 1 or predetermined information (for example, information indicating an operation received via the touch panel 22).

In the present embodiment, the control device 30 is configured to refer to the map information database 24 (that is, map information) of the navigation device 20. However, the present invention is not limited thereto. Map information including road network information similar to that of the map information database 24 may be separately stored in the control device 30 or the like, and the control device 30 may refer to such map information.

The control device 30 is a computer that includes, for example, a processor configured to perform various calculations, a storage unit having a non-transitory storage medium (for example, a flash memory) for storing various types of information, and an input and output unit configured to control input and output of data between the inside and the outside of the control device 30 (none illustrated), and executes overall control of the vehicle 1. For example, the control device 30 is implemented by one electronic control unit (ECU) or by a plurality of ECUs working in cooperation with each other. Since specific examples of control executed by the control device 30 will be described later, the description thereof will be omitted here.

The EPS system 40 includes a steering angle sensor 41, a torque sensor 42, an EPS motor 43, a resolver 44, and an EPS ECU 45.

The steering angle sensor 41 detects a steering angle $\theta st$ of the steering wheel 46 and outputs information indicating the detected steering angle $\theta st$ to the EPS ECU 45. The torque sensor 42 detects a steering torque TQ, which is a torque applied to the steering wheel 46 of the vehicle 1, and outputs information indicating the detected steering torque TQ to the EPS ECU 45.

The EPS motor 43 assists the driver in operating the steering wheel 46 by applying, according to an instruction from the EPS ECU 45, a driving force or a reaction force to a steering column 47 connected to the steering wheel 46. The resolver 44 detects a rotation angle $\theta m$ of the EPS motor 43 and outputs information indicating the detected rotation angle $\theta m$ to the EPS ECU 45.

The EPS ECU 45 is a computer that includes, for example, a processor configured to perform various calculations, a storage unit having a non-transitory storage medium for storing various types of information, and an input and output unit configured to control input and output of data between the inside and the outside of the EPS ECU 45 (none illustrated), and controls the EPS system 40 (for example, the EPS motor 43). The EPS ECU 45 is implemented by one or two or more ECUs. For example, the EPS ECU 45 controls the EPS system 40 (for example, the EPS motor 43) based on the steering angle $\theta st$ detected by the steering angle sensor 41, the steering torque TQ detected by the torque sensor 42, the rotation angle $\theta m$ detected by the resolver 44, and the like.

The EPS system 40 (for example, the EPS ECU 45) may output, to the control device 30, information indicating the steering angle $\theta st$ detected by the steering angle sensor 41, the steering torque TQ detected by the torque sensor 42, the rotation angle $\theta m$ detected by the resolver 44, and the like. Further, the EPS system 40 (for example, the EPS ECU 45) may output information indicating a steering speed $\omega$ of the steering wheel 46 to the control device 30. In this case, the steering speed $\omega$ is obtained by, for example, differentiating the steering angle $\theta st$ with respect to time.

The driving force control system 50 includes a drive ECU 51, and is configured to control a driving force of the vehicle 1. The drive ECU 51 is a computer that includes, for example, a processor configured to perform various calculations, a storage unit having a non-transitory storage medium for storing various types of information, and an input and output unit configured to control input and output of data between the inside and the outside of the drive ECU 51 (none illustrated), and controls the driving force control system 50. The drive ECU 51 is implemented by one or more ECUs. For example, based on an operation on an accelerator pedal 52 provided in the vehicle 1, the drive ECU 51 controls the power output from the drive source of the vehicle 1. The drive ECU 51 can also control the driving force control system 50 (for example, a drive source) according to an instruction from the control device 30.

The braking force control system 60 includes a braking ECU 61, and is configured to control a braking force of the vehicle 1. The braking ECU 61 is a computer that includes, for example, a processor configured to perform various calculations, a storage unit having a non-transitory storage medium for storing various types of information, and an input and output unit configured to control input and output of data between the inside and the outside of the braking ECU 61 (none illustrated), and controls the braking force control system 60. The braking ECU 61 is implemented by one or more ECUs. For example, the braking ECU 61 controls the braking force of the vehicle 1 by controlling a brake device (not illustrated) provided in the vehicle 1 based on an operation on a brake pedal 62 provided in the vehicle 1. Here, the brake device includes, for example, a brake caliper, a cylinder that transmits a hydraulic pressure to the brake caliper, and an electric motor that generates a hydraulic pressure in the cylinder. The braking ECU 61 controls the electric motor of the brake device such that a braking force corresponding to the operation on the brake pedal 62 is generated. The braking ECU 61 can also control the braking force control system 60 (for example, a brake device) according to an instruction from the control device 30.

The communication unit 70 is a communication interface that communicates with an external device 2 under control executed by the control device 30. That is, the control device 30 may communicate with the external device 2 via the communication unit 70. Examples of the external device 2 can include a terminal device (for example, a smartphone) of the driver and a server device managed by a manufacturer of the vehicle 1. For example, a mobile communication network such as a cellular line, WI-FI (registered trademark), or Bluetooth (registered trademark) can be adopted for the communication between the vehicle 1 and the external device 2.

The alarm device 90 is a device that alarms the driver according to the control of the control device 30. The alarm device 90 includes, for example, a multi-information display (MID) 91 and a buzzer 92.

The MID 91 is implemented by a display device such as a liquid crystal display or an OLED, and is provided at a position that the driver can visually recognize (for example, in a meter panel of the vehicle 1). For example, the MID 91 displays a predetermined alarm image in accordance with an instruction from the control device 30. The MID 91 may be integrated with the touch panel 22 described above. That is, the "MID 91" in the following description may be interpreted as the "touch panel 22".

The buzzer 92 is configured to output a predetermined alarm sound. For example, the buzzer 92 outputs a predetermined alarm sound in accordance with an instruction from the control device 30. The buzzer 92 may be integrated with the speaker 23 described above. That is, the "buzzer 92" in the following description may be interpreted as the "speaker 23".

2. Control Device

Next, the control device 30 will be described in more details. The control device 30 includes, for example, a first recognition unit 31, a second recognition unit 32, a determination unit 33, a setting unit 34, a calculation unit 35, and a vehicle control unit 36 as functional units implemented by the processor executing a program stored in the storage unit of the control device 30.

The first recognition unit 31 recognizes the surrounding situation of the vehicle 1 based on the peripheral information obtained by the external sensor 11 including the camera 111 for imaging at least the front of the vehicle 1. For example, the first recognition unit 31 performs sensor fusion processing on detection results obtained by some or all of the camera 111, the sonar 112, and the radar 113 in the external sensor 11, and recognizes the surrounding situation of the vehicle 1 based on a processing result.

The first recognition unit 31 recognizes a position, a type, a speed, an acceleration, and the like of an object present around the vehicle 1 as the surrounding situation of the vehicle 1. At this time, the first recognition unit 31 recognizes the position of the object as a position on absolute coordinates in which a representative point (for example, a center of gravity and a center of a drive shaft) of the vehicle 1 is set as an origin. Accordingly, a relative position between the vehicle 1 and the object present around can be recognized. In the absolute coordinate system, the position of the object may be represented using a representative point such as a center of gravity or a corner of the object, or may be represented as an area.

Examples of objects that can be recognized by the first recognition unit 31 include traffic participants such as other vehicles and pedestrians, traveling lane boundaries that define lanes such as division lines, curbs and separation zones, road structures such as guard rails and road shoulders, and features such as buildings, fences and trees. The first recognition unit 31 may recognize, for example, other road events such as a crosswalk, a stop line, a traffic light, a road sign, a branch, a junction, an interchange, and a tollbooth of a toll road.

According to the first recognition unit 31, for example, it is possible to recognize a shape of a road on which the vehicle 1 travels (hereinafter, also referred to as a "travel path RD"). Furthermore, according to the first recognition unit 31, it is possible to recognize a traffic participant (for example, another vehicle) present around the vehicle 1, a feature (for example, a building) present around the vehicle 1, a structure (for example, a guard rail) provided at a boundary between the travel path RD and the outside of the travel path RD to prevent the entry into the travel path RD, and a road event such as a crosswalk and a traffic light present around the vehicle 1.

If the first recognition unit 31 recognizes a shielding object present in front of the vehicle 1 (hereinafter, also referred to as a "shielding object SO"), the second recognition unit 32 recognizes a shielding area shielded by the shielding object SO (hereinafter also referred to as a "shielding area SA"). In the present embodiment, for example, a feature such as a building or another vehicle present around the vehicle 1 is recognized as the shielding object SO. The second recognition unit 32 recognizes an area behind the object recognized as the shielding object SO when viewed from the vehicle 1 as the shielding area SA shielded by the shielding object SO.

The determination unit 33 determines an attribute of the shielding object SO based on the recognition result of the first recognition unit 31. For example, the determination unit 33 determines the attribute of the shielding object SO based on a position where the shielding object SO is present or a type of the object as the shielding object SO. In the present embodiment, the determination unit 33 determines, for example, whether the shielding object SO is a crossing road shielding object (hereinafter, also referred to as a "crossing road shielding object SO1"), a connecting road shielding object (hereinafter also referred to as a "connecting road shielding object SO2"), or a non-crossing road shielding object (hereinafter, also referred to as a "non-crossing road shielding object SO3") as the attribute of the shielding object SO.

Here, the crossing road shielding object SO1 is a shielding object that shields at least a part of a crossing road (hereinafter, also referred to as an "crossing road RDx") that is a road crossing the travel path RD in front of the vehicle 1 (see, for example, FIG. 2). For example, the determination unit 33 may determine a feature such as a building or a fence present in front of the crossing road RDx when viewed from the vehicle 1 as the crossing road shielding object SO1. An example of a method for determining the crossing road shielding object SO1 will be described later.

The connecting road shielding object SO2 is a shielding object that shields at least a part of a connecting road (hereinafter, also referred to as a "connecting road RDc") that is a road connected to the travel path RD in front of the vehicle 1 (see, for example, FIG. 4). For example, the determination unit 33 may determine a feature such as a building or a fence present in front of the connecting road RDc when viewed from the vehicle 1 as the connecting road shielding object SO2.

The non-crossing road shielding object SO3 is a shielding object different from the crossing road shielding object SO1 and the connecting road shielding object SO2. For example, the determination unit 33 may determine another vehicle stopped in front of the vehicle 1 as the non-crossing road shielding object SO3.

The determination unit 33 may determine whether the shielding object SO is a vehicle as the attribute of the shielding object SO. Furthermore, the determination unit 33 may determine whether the shielding object SO is an oncoming vehicle as the attribute of the shielding object SO. Here, the oncoming vehicle is another vehicle oriented in a direction opposite to the vehicle 1 (in other words, another vehicle traveling in a direction opposite to the vehicle 1). By configuring the determination unit 33 to also determine whether the shielding object SO is a vehicle (e.g., an oncoming vehicle), it is possible to set an appropriate processing target area PT (described later) even if the shielding object SO is a vehicle.

If the control device 30 is configured to refer to map information such as the map information database 24, the determination unit 33 may determine the attribute of the shielding object SO based on the recognition result of the first recognition unit and the map information. In this case, for example, the determination unit 33 first identifies a location (for example, latitude and longitude) where the shielding object SO is positioned from the relative position between the shielding object SO and the vehicle 1 recognized by the first recognition unit 31 and the current position of the vehicle 1 identified by the navigation device 20 (for example, the GNSS receiver 21). Then, the determination unit 33 may refer to the road network information included in the map information and determine the attribute of the shielding object SO based on the location where the shielding object SO is positioned.

In this way, by determining the attribute of the shielding object SO using the map information in addition to the recognition result of the first recognition unit 31, the attribute of the shielding object SO can be determined more accurately than the case where the attribute of the shielding object SO is determined based on only the recognition result of the first recognition unit 31.

Based on the recognition result of the second recognition unit 32 and the determination result of the determination unit 33, the setting unit 34 sets the shielding area SA and the predetermined processing target area PT with respect to a front image of the vehicle 1 (hereinafter also referred to as "front image FI") obtained based on the imaging result of the camera 111. Here, the front image FI is, for example, an image obtained as an imaging result of an imaging device that images the front of the vehicle 1, but is not limited to this, and may be an image obtained by combining the imaging results of imaging devices that images the front and the left and right sides of the vehicle 1. Since an example of a specific method for setting the shielding area SA and the processing target area PT will be described later, the description thereof will be omitted here.

The calculation unit 35 calculates a risk degree (hereinafter, also referred to as a "risk degree VR") corresponding to the shielding object SO that forms the shielding area SA, based on a size of an overlapping area (hereinafter, also referred to as an "overlapping area OA") of the shielding area SA and the processing target area PT set by the setting unit 34.

Here, the risk degree VR is an evaluation value representing a magnitude of a risk that the vehicle 1 collides with a moving object (for example, another vehicle or a pedestrian) that may enter the travel path RD from behind the shielding object SO (in other words, the shielding area SA shielded by the shielding object SO). That is, the risk degree VR increases as the risk is assumed to be large. Since an example of a specific method for calculating the risk degree VR will be described later, the description thereof will be omitted here.

The vehicle control unit 36 controls the vehicle 1 (for example, acceleration and deceleration of the vehicle 1) based on the risk degree VR calculated by the calculation unit 35. In the present embodiment, the vehicle control unit 36 executes collision reduction control. Specifically, for example, if the calculated risk degree VR is a predetermined first threshold or more and is less than a predetermined second threshold (however, second threshold>first threshold), the vehicle control unit 36 issues an alarm for calling attention of the driver via the alarm device 90 before the vehicle 1 reaches near the shielding object SO corresponding to the risk degree VR. If the calculated risk degree VR is the second threshold or more, in addition to the above-described alarm, the vehicle control unit 36 brakes the vehicle 1 via the braking force control system 60 such that the vehicle 1 stops at a position in front of the shielding object SO or the shielding area SA corresponding to the risk degree VR. The first threshold and the second threshold are determined in advance by the manufacturer of the vehicle 1. The alarm described above can be implemented, for example, by causing the MID 91 to display a predetermined alarm image or outputting a predetermined alarm sound from the buzzer 92.

2-1. Example Method for Setting Shielding Area and Processing Target Area

Next, an example of a specific method for setting the shielding area SA and the processing target area PT in the front image FI will be described.

(Case of Crossing Road Shielding Object)

Figure 2:
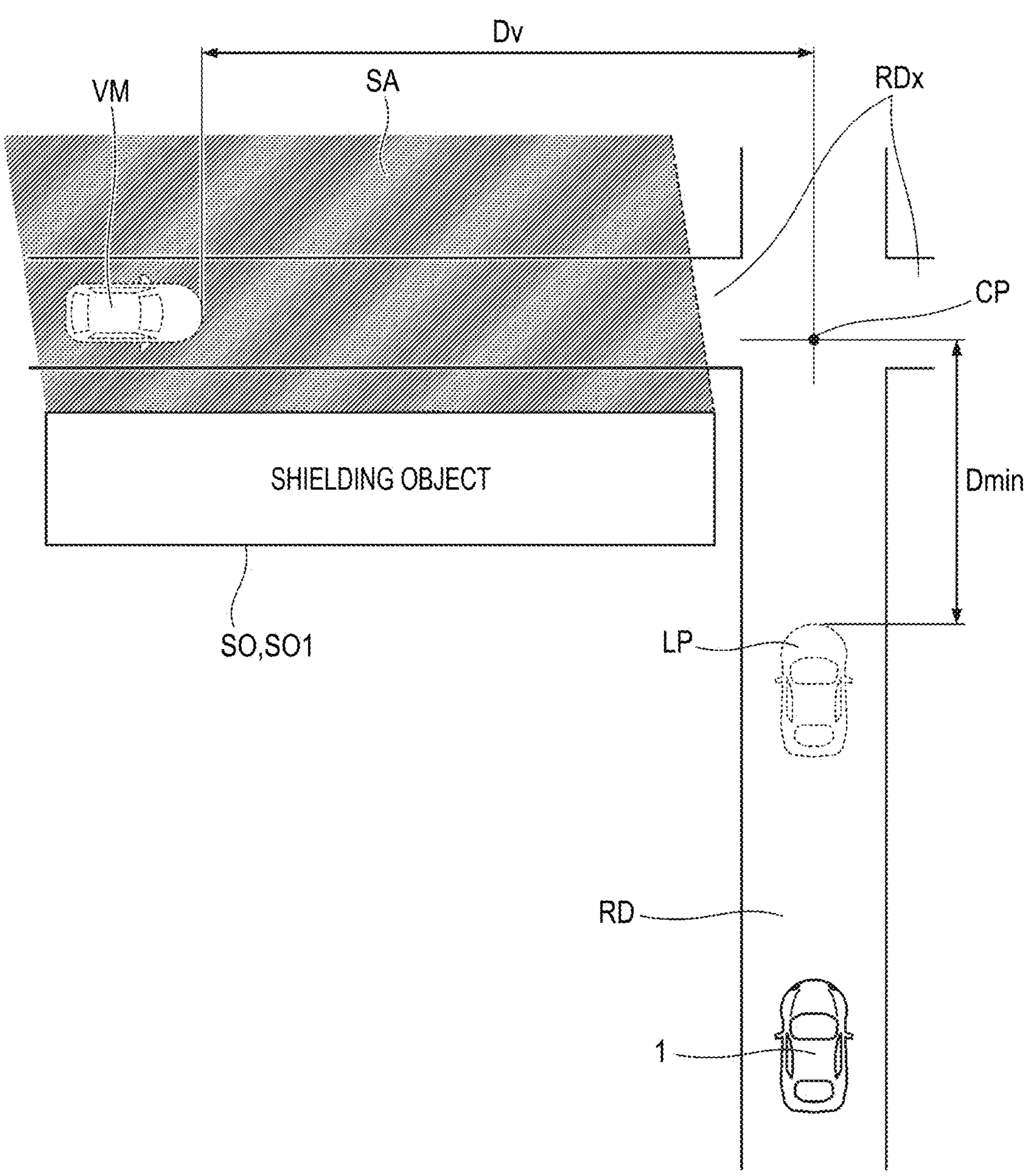
FIG. 2 is a diagram illustrating an example of a situation in which a crossing road shielding object SO1 that shields a crossing road RDx that is a road crossing a travel path RD on which the vehicle 1 travels is present in front of the vehicle 1.

In the example illustrated in FIG. 2, a shielding object SO (for example, a building) is present in front of the left side portion of the crossing road RDx crossing the travel path RD (in other words, the front left side of the vehicle 1). In the example illustrated in FIG. 2, the vehicle 1 travels on the travel path RD toward the intersection between the travel path RD and the crossing road RDx.

Figure 3:
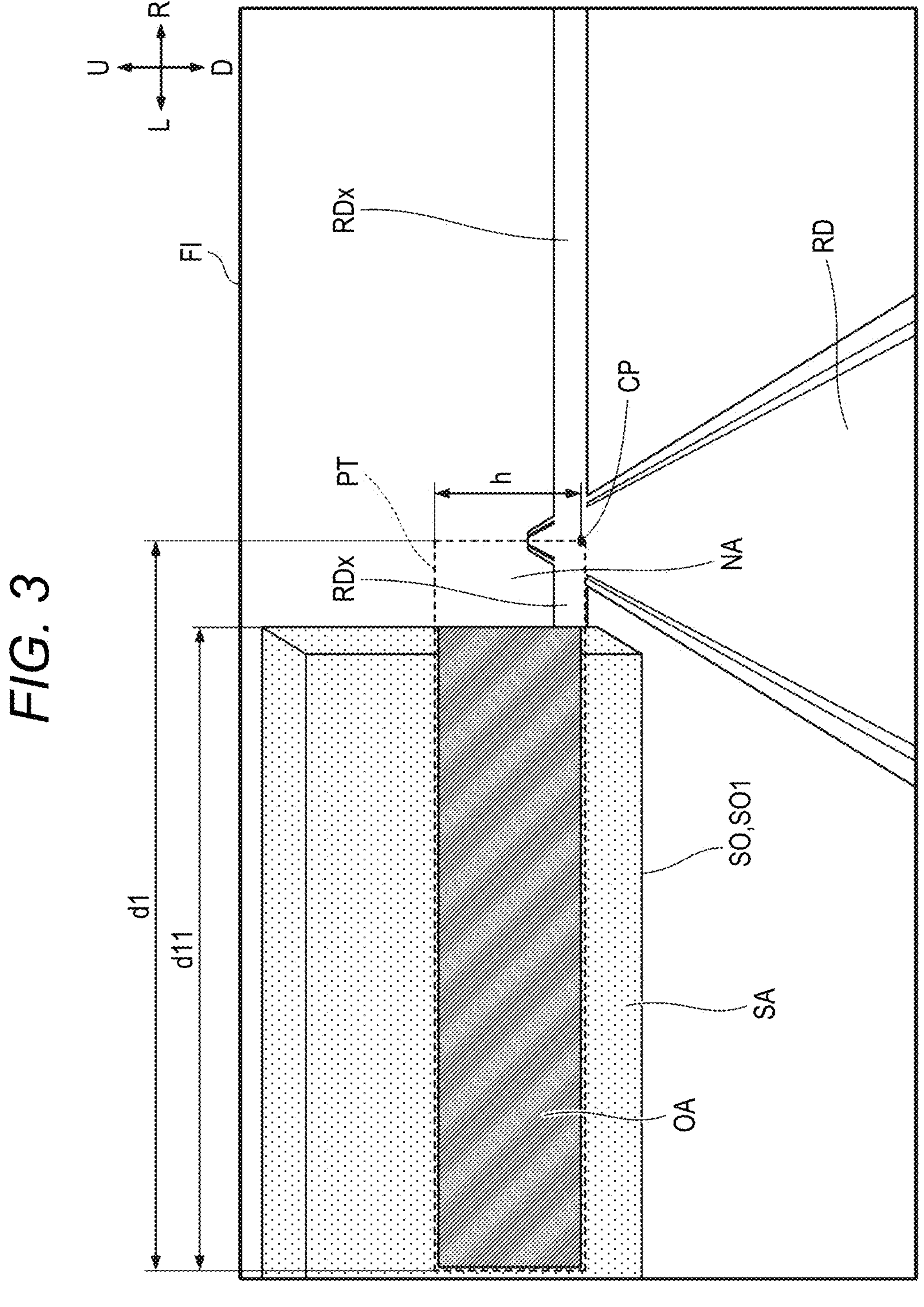
FIG. 3 is a diagram illustrating an example of a front image FI of the vehicle 1 in the situation illustrated in FIG. 2.

FIG. 3 illustrates an example of the front image FI in the situation illustrated in FIG. 2. The left-right direction in the front image FI illustrated in FIG. 3 (the direction indicated by L-R in FIG. 3) is a direction corresponding to the left-right direction in the vehicle 1 (in other words, the width direction of the vehicle 1), and is an example of a first direction in the present invention. The upper-lower direction in the front image FI illustrated in FIG. 3 (the direction indicated by U-D in FIG. 3) is a direction corresponding to the upper-lower direction in the vehicle 1, and is an example of a second direction in the present invention.

In the situation illustrated in FIG. 2, the first recognition unit 31 recognizes the shielding object SO present in front of the left side portion of the crossing road RDx, and the second recognition unit 32 recognizes the shielding area SA shielded by the shielding object SO. Since the shielding object SO shields the left side portion of the crossing road RDx, the determination unit 33 determines the shielding object SO as the crossing road shielding object SO1.

Then, the setting unit 34 sets the shielding area SA shielded by the shielding object SO, which is determined as the crossing road shielding object SO1, with respect to the front image FI. For example, as indicated by the hatching with the dot pattern in FIG. 3, the setting unit 34 sets as the shielding area SA the area on the front image FI corresponding to the shielding object SO, which is determined as the crossing road shielding object SO1. In addition, the setting unit 34 sets the processing target area PT used for calculating the risk degree VR corresponding to the shielding object SO, which is determined as the crossing road shielding object SO1, with respect to the front image FI.

For example, as illustrated in FIG. 2, a virtual moving object VM, which is a moving object such as another vehicle that enters the travel path RD from the crossing road RDx, may be present in the crossing road RDx shielded by the crossing road shielding object SO1.

In such a case, when setting the processing target area PT, the setting unit 34 first derives a virtual collision point CP, which is a virtual collision point between the vehicle 1 and the virtual moving object VM assuming that the virtual moving object VM enters the travel path RD from the crossing road RDx when the vehicle 1 reaches the intersection between the travel path RD and the crossing road RDx. The setting unit 34 may derive the virtual collision point CP based on the shape, the traveling line, and the like of the vehicle 1, or may easily derive any point in the intersection between the travel path RD and the crossing road RDx (for example, the entrance or the center on the side of the intersection closer to the travel path RD) as the virtual collision point CP.

As illustrated in FIG. 3, the setting unit 34 sets as the processing target area PT, in the front image FI, an area extending toward the crossing road shielding object SO1 along the left-right direction (that is, a direction corresponding to the width direction of the vehicle 1) with reference to the virtual collision point CP and having a predetermined height h in the upper-lower direction (that is, a direction corresponding to the upper-lower direction of the vehicle 1). In the following description, the height h (that is, the length in the upper-lower direction) of the processing target area PT in the front image FI is also referred to as a "vertical distance h of the processing target area PT". The length in the left-right direction of the processing target area PT in the front image FI is also referred to as a "horizontal distance d1 of the processing target area PT".

The vertical distance h of the processing target area PT may be determined freely by the manufacturer of the vehicle 1, and may be set to, for example, a height corresponding to a distance of 2 [m] above the ground at the virtual collision point CP. This is in consideration of a situation in which an object present in the range of the distance of 2 [m] above the ground at the virtual collision point CP may collide with the vehicle 1 but an object present further above is less likely to collide with the vehicle 1.

In this way, by determining the vertical distance h of the processing target area PT in consideration of the range in which an object colliding with the vehicle 1 may be present, it is possible to set a processing target area PT having an appropriate vertical distance h without excessively enlarging the processing target area PT in the upper-lower direction.

If it is determined that the shielding object SO is the crossing road shielding object SO1, the setting unit 34 sets the horizontal distance d1 of the processing target area PT to a length corresponding to the distance corresponding to a predetermined first speed and a minimum braking time Tmin.

Here, the minimum braking time Tmin is a time required for the vehicle 1 to stop when the vehicle 1 is decelerated at a predetermined deceleration x from the current vehicle speed VP (that is, the travel speed). The deceleration x may be a deceleration generated when a so-called "sudden braking" is applied to the vehicle 1, and can be set to 0.6 G (G here is the gravitational acceleration) as an example. In the following description, the braking distance of the vehicle 1 when the vehicle 1 is decelerated at the deceleration x from the current vehicle speed VP is also referred to as a "minimum braking distance Dmin".

As illustrated in FIG. 2, if the virtual moving object VM is present in the crossing road RDx shielded by the crossing road shielding object SO1, the virtual moving object VM may be moving along the crossing road RDx toward the intersection between the travel path RD and the crossing road RDx at a movement speed of about 30 [km/h]. In addition, as illustrated in FIG. 2, in the case of the crossing road RDx, since the intersection between the travel path RD and the crossing road RDx has a cross shape, the virtual moving object VM that may be present in the crossing road RDx can go straight across the intersection between the travel path RD and the crossing road RDx. Therefore, in this case, the virtual moving object VM moving at a movement speed of about 30 [km/h] from the crossing road RDx shielded by the crossing road shielding object SO1 may enter the travel path RD.

In order to prevent the vehicle 1 from colliding with the virtual moving object VM, it is desirable that the driver can visually recognize a range up to a location away from the virtual collision point CP in a direction in which the virtual moving object VM may be present by a virtual movement distance Dv. The virtual movement distance Dv is a distance that the virtual moving object VM can move within the minimum braking time Tmin at a time point before the vehicle 1 reaches a collision avoidance limit location LP, which is a location in front of the virtual collision point CP by the minimum braking distance Dmin in the travel path RD. In other words, the range from the virtual collision point CP to a location separated from the virtual collision point CP by the virtual movement distance Dv in a direction in which the virtual moving object VM may be present is also referred to as a "range to be seen originally" by the driver.

If it is determined that the shielding object SO is the crossing road shielding object SO1, the setting unit 34 sets the first speed to 30 [km/h] and sets the horizontal distance d1 of the processing target area PT to a length corresponding to a distance represented by the product of the minimum braking time Tmin and 30 [km/h], for example. That is, by setting the first speed to 30 [km/h], which is considered as the movement speed of the virtual moving object VM that may be present in the crossing road RDx, it is possible to set the processing target area PT having the horizontal distance d1 corresponding to the virtual movement distance Dv of the virtual moving object VM that may be present in the crossing road RDx if the crossing road shielding object SO1 that shields the crossing road RDx is present in front of the vehicle 1. In other words, if the crossing road shielding object SO1 that shields the crossing road RDx is present in front of the vehicle 1, it is possible to set the processing target area PT having the horizontal distance d1 corresponding to the "range to be seen originally" by the driver. Therefore, it is possible to set the processing target area PT having an appropriate horizontal distance d1 according to the surrounding situation of the vehicle 1.

In the example described here, the first speed is 30 [km/h], but is not limited thereto. For example, the first speed may be determined freely by the manufacturer of the vehicle 1, and may be less than 30 [km/h] or greater than 30 [km/h]. If the control device 30 can refer to the map information such as the map information database 24, the setting unit 34 may refer to the map information and use the legal speed or the like of the crossing road RDx shielded by the crossing road shielding object SO1 as the first speed.

As described above, according to the setting unit 34, if it is determined that the shielding object SO is the crossing road shielding object SO1, it is possible to set as the processing target area PT, in the front image FI, an area extending toward the crossing road shielding object SO1 along the left-right direction with reference to the virtual collision point CP between the vehicle 1 and the virtual moving object VM that may enter the travel path RD at the first speed (for example, 30 [km/h]) from the crossing road RDx on the side closer to the crossing road shielding object SO1. Further, it is possible to set the horizontal distance d1, which is the length of the processing target area in the left-right direction in this case, to a length corresponding to a distance corresponding to the first speed and the minimum braking time Tmin, which is the braking time when the vehicle 1 is decelerated at the predetermined deceleration x. Accordingly, it is possible to set the processing target area PT having an appropriate horizontal distance d1 according to the surrounding situation of the vehicle 1.

Therefore, according to the control device 30, it is possible to calculate an appropriate risk degree VR according to the surrounding situation of the vehicle 1 on the assumption that the risk degree VR corresponding to the shielding object SO present in front of the vehicle 1 is calculated using the front image FI. Specifically, if the crossing road shielding object SO1 is present in front of the vehicle 1, the risk degree VR in consideration of the virtual moving object VM that may enter the travel path RD at the first speed from the crossing road RDx shielded by the crossing road shielding object SO1 can be calculated as the risk degree VR corresponding to the crossing road shielding object SO1. Accordingly, it is possible to calculate an appropriate risk degree VR according to the surrounding situation of the vehicle 1 and appropriately control the vehicle 1 based on the risk degree VR with a simple configuration. Further, this can contribute to development of a sustainable transportation system.

Further, according to the setting unit 34, it is possible to set a rectangular processing target area PT extending in the left-right direction and having a predetermined height h in the upper-lower direction. Accordingly, it is possible to simplify the setting of the processing target area PT, and to reduce the processing load of the control device 30 when setting the processing target area PT.

(Case of Connecting Road Shielding Object)

Figure 4:
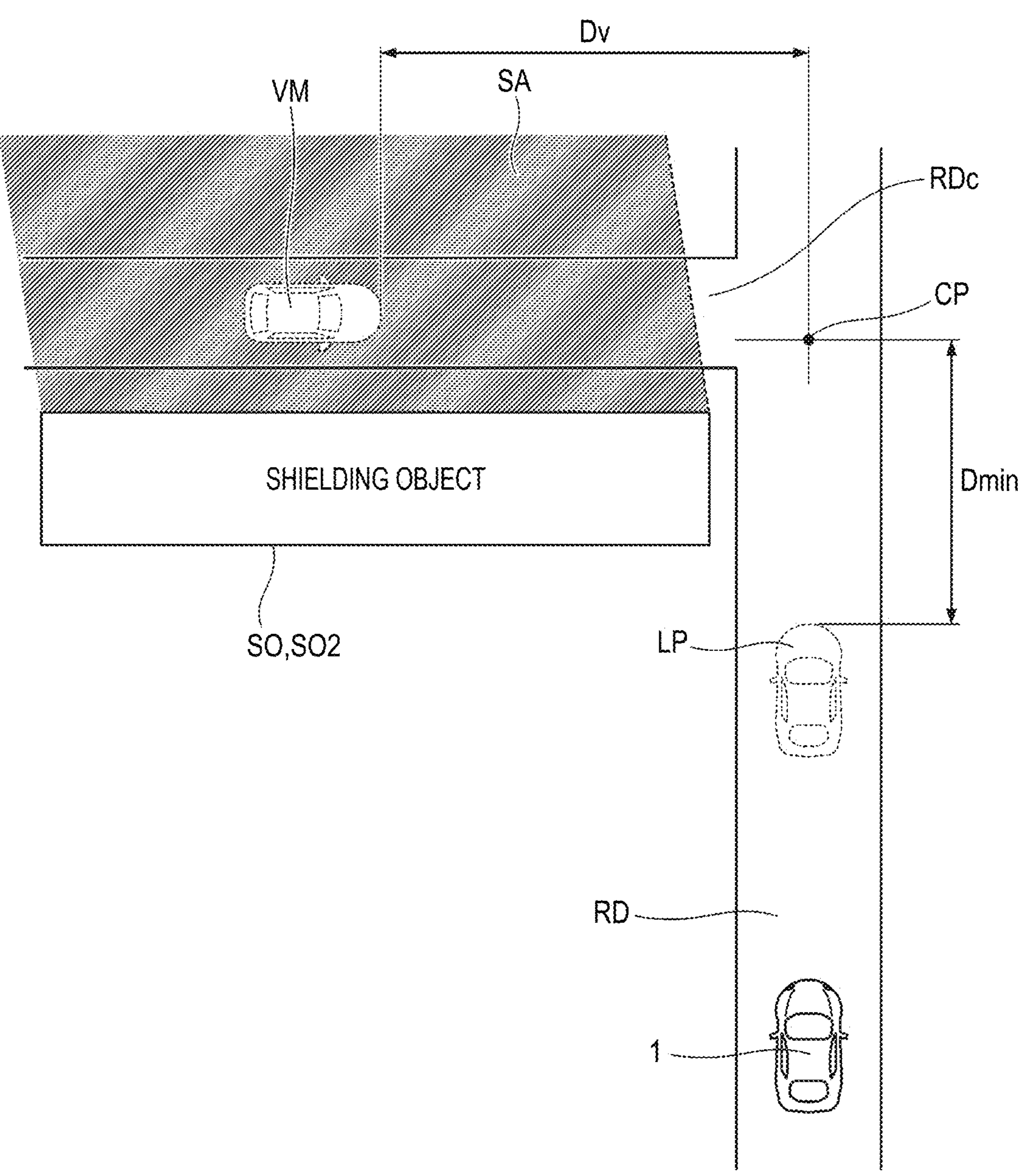
FIG. 4 is a diagram illustrating an example of a situation in which a connecting road shielding object SO2 that shields a connecting road RDc that is a road connected to a travel path RD on which the vehicle 1 travels is present in front of the vehicle 1.

In the example illustrated in FIG. 4, a connecting road RDc is present instead of the crossing road RDx in the example illustrated in FIG. 2. Here, the connecting road RDc is a road connected to the travel path RD in front of the vehicle 1, and connects to the left side of the travel path RD in front of the vehicle 1 in the example illustrated in FIG. 4. In the example illustrated in FIG. 4, a shielding object SO (for example, a building) is present in front of the connecting road RDc, and the vehicle 1 travels on the travel path RD toward the connection point between the travel path RD and the connecting road RDc.

In the situation illustrated in FIG. 4, similar as the situation illustrated in FIG. 2, the first recognition unit 31 recognizes the shielding object SO present in front of the connecting road RDc, and the second recognition unit 32 recognizes the shielding area SA shielded by the shielding object SO. Since the shielding object SO shields the connecting road RDc, the determination unit 33 determines the shielding object SO as the connecting road shielding object SO2. Then, the setting unit 34 sets the shielding area SA shielded by the shielding object SO, which is determined as the connecting road shielding object SO2, and the processing target area PT, with respect to the front image FI.

For example, as illustrated in FIG. 4, a virtual moving object VM, which is likely to enter the travel path RD from the connecting road RDc, may be present in the connecting road RDc shielded by the connecting road shielding object SO2. In such a case, when setting the processing target area PT, the setting unit 34 first derives the virtual collision point CP between the vehicle 1 and the virtual moving object VM assuming that the virtual moving object VM enters the travel path RD from the connecting road RDc when the vehicle 1 reaches the connection point between the travel path RD and the connecting road RDc. The setting unit 34 sets as the processing target area PT, in the front image FI, an area extending toward the connecting road shielding object SO2 along the left-right direction from the virtual collision point CP and having a predetermined height h in the upper-lower direction.

Similarly to, for example, the vertical distance h of the processing target area PT set when the shielding object SO is determined as the crossing road shielding object SO1, the vertical distance h of the processing target area PT set when the shielding object SO is determined as the connecting road shielding object SO2 can also be set to, for example, a height corresponding to a distance of 2 [m] above the ground at the virtual collision point CP.

On the other hand, it is preferable that the horizontal distance d1 of the processing target area PT set when the shielding object SO is determined as the connecting road shielding object SO2 be shorter than the horizontal distance d1 of the processing target area PT set when the shielding object SO is determined as the crossing road shielding object SO1.

That is, as described above, in the case of the crossing road RDx, since the intersection between the travel path RD and the crossing road RDx has a cross shape, the virtual moving object VM that may be present in the crossing road RDx can go straight across the intersection between the travel path RD and the crossing road RDx. On the other hand, as illustrated in FIG. 4, in the case of the connecting road RDc, since the connection point between the travel path RD and the connecting road RDc has a T-shape, the virtual moving object VM that may be present in the connecting road RDc cannot go straight across the connection point between the travel path RD and the connecting road RDc. Therefore, it is considered that the virtual moving object VM that enters the travel path RD from the connecting road RDc decelerates before entering the travel path RD. In other words, if the shielding object SO is the connecting road shielding object SO2, the virtual movement distance Dv that the virtual moving object VM can move within the minimum braking time Tmin (in other words, the "range to be seen originally" by the driver) may be shorter than the case of the crossing road shielding object SO1.

If it is determined that the shielding object SO is the connecting road shielding object SO2, the setting unit 34 sets the horizontal distance d1 of the processing target area PT to a length corresponding to a distance corresponding to a third speed lower than the first speed described above and the minimum braking time Tmin. More specifically, in this case, the setting unit 34 sets the horizontal distance d1 of the processing target area PT to a length corresponding to a distance represented by the product of the minimum braking time Tmin and the third speed. Accordingly, if the connecting road shielding object SO2 that shields the connecting road RDc is present in front of the vehicle 1, it is possible to set the processing target area PT having the horizontal distance d1 corresponding to the virtual movement distance Dv of the virtual moving object VM that may be present in the connecting road RDc. In other words, if the connecting road shielding object SO2 that shields the connecting road RDc is present in front of the vehicle 1, it is possible to set the processing target area PT having the horizontal distance d1 corresponding to the "range to be seen originally" by the driver. Therefore, it is possible to set the processing target area PT having an appropriate horizontal distance d1 according to the surrounding situation of the vehicle 1.

The third speed may be determined freely by the manufacturer of the vehicle 1, for example, 15 [km/h]. The third speed is not limited to 15 [km/h], and may be less than 15 [km/h] or greater than 15 [km/h]. If the control device 30 can refer to the map information such as the map information database 24, the setting unit 34 may obtain the third speed in consideration of the legal speed or the like of the connecting road RDc shielded by the connecting road shielding object SO2 with reference to the map information.

As described above, according to the setting unit 34, if it is determined that the shielding object SO is the connecting road shielding object SO2, it is possible to set as the processing target area PT, in the front image FI, an area extending toward the connecting road shielding object SO2 along the left-right direction with reference to the virtual collision point CP between the vehicle 1 and the virtual moving object VM that may enter the travel path RD at the third speed (for example, 15 [km/h]) from the connecting road RDc. Further, it is possible to set the horizontal distance d1, which is the length of the processing target area in the left-right direction in this case, to a length corresponding to a distance corresponding to the third speed and the minimum braking time Tmin, which is the braking time when the vehicle 1 is decelerated at the predetermined deceleration x. Accordingly, it is possible to set the processing target area PT having an appropriate horizontal distance d1 according to the surrounding situation of the vehicle 1.

Therefore, according to the control device 30, it is possible to calculate an appropriate risk degree VR according to the surrounding situation of the vehicle 1 on the assumption that the risk degree VR corresponding to the shielding object SO present in front of the vehicle 1 is calculated using the front image FI. Specifically, if the connecting road shielding object SO2 is present in front of the vehicle 1, the risk degree VR in consideration of the virtual moving object VM that may enter the travel path RD at the third speed from the connecting road RDc shielded by the connecting road shielding object SO2 can be calculated as the risk degree VR corresponding to the connecting road shielding object SO2. Accordingly, it is possible to calculate an appropriate risk degree VR according to the surrounding situation of the vehicle 1 and appropriately control the vehicle 1 based on the risk degree VR with a simple configuration.

(Case of Non-Crossing Road Shielding Object)

If the determination unit 33 determines the shielding object SO as the non-crossing road shielding object SO3, the setting unit 34 also sets the shielding area SA shielded by the shielding object SO, which is determined as the non-crossing road shielding object SO3, and the processing target area PT, with respect to the front image FI.

That is, in such a case, the setting unit 34 derives the virtual collision point CP between the vehicle 1 and the virtual moving object VM assuming that the virtual moving object VM enters the travel path RD from behind the non-crossing road shielding object SO3 (that is, the shielding area SA shielded by the non-crossing road shielding object SO3). The setting unit 34 sets as the processing target area PT an area extending toward the non-crossing road shielding object SO3 along the left-right direction from the virtual collision point CP and having a predetermined height h in the upper-lower direction.

Similarly to, for example, the vertical distance h of the processing target area PT set when the shielding object SO is determined as the crossing road shielding object SO1 or the connecting road shielding object SO2, the vertical distance h of the processing target area PT set when the shielding object SO is determined as the non-crossing road shielding object SO3 can also be set to, for example, a height corresponding to a distance of 2 [m] above the ground at the virtual collision point CP.

On the other hand, it is preferable that the horizontal distance d1 of the processing target area PT set when the shielding object SO is determined as the non-crossing road shielding object SO3 be shorter than the horizontal distance d1 of the processing target area PT set when the shielding object SO is determined as the crossing road shielding object SO1 or the connecting road shielding object SO2.

That is, as described above, the determination unit 33 may determine another vehicle stopped in front of the vehicle 1 as the non-crossing road shielding object SO3. Therefore, the moving object that may enter the travel path RD from behind the shielding object SO determined as the non-crossing road shielding object SO3 is likely, for example, a pedestrian or a bicycle, which has a low movement speed.

If it is determined that the shielding object SO is the non-crossing road shielding object SO3, the setting unit 34 sets the horizontal distance d1 of the processing target area PT to a length corresponding to a distance corresponding to the second speed lower than the first speed or the third speed described above and the minimum braking time Tmin. More specifically, in this case, the setting unit 34 sets the horizontal distance d1 of the processing target area PT to a length corresponding to a distance represented by the product of the minimum braking time Tmin and the second speed. Accordingly, if the non-crossing road shielding object SO3 is present in front of the vehicle 1, it is possible to set the processing target area PT having the horizontal distance d1 corresponding to the virtual movement distance Dv of the virtual moving object VM that may be present in the shielding area SA shielded by the non-crossing road shielding object SO3. In other words, if the non-crossing road shielding object SO3 is present in front of the vehicle 1, it is possible to set the processing target area PT having the horizontal distance d1 corresponding to the "range to be seen originally" by the driver. Therefore, it is possible to set the processing target area PT having an appropriate horizontal distance d1 according to the surrounding situation of the vehicle 1.

The second speed may be determined freely by the manufacturer of the vehicle 1, for example, 5 [km/h]. The second speed is not limited to 5 [km/h], and may be less than 5 [km/h] or greater than 5 [km/h].

As described above, according to the setting unit 34, if it is determined that the shielding object SO is the non-crossing road shielding object SO3, it is possible to set as the processing target area PT,3 in the front image FI, an area extending toward the non-crossing road shielding object SO3 along the left-right direction with reference to the virtual collision point CP between the vehicle 1 and the virtual moving object VM that may enter the travel path RD at the second speed (for example, 5 [km/h]) from the shielding area SA shielded by the non-crossing road shielding object SO3. Further, it is possible to set the horizontal distance d1, which is the length of the processing target area PT in the left-right direction in this case, to a length corresponding to a distance according to the above-mentioned second speed and the minimum braking time Tmin, which is the braking time when the vehicle 1 is decelerated at the predetermined deceleration x.

Therefore, according to the control device 30, it is possible to calculate an appropriate risk degree VR according to the surrounding situation of the vehicle 1 on the assumption that the risk degree VR corresponding to the shielding object SO present in front of the vehicle 1 is calculated using the front image FI. Specifically, if the non-crossing road shielding object SO3 is present in front of the vehicle 1, the risk degree VR in consideration of the virtual moving object VM that may enter the travel path RD at the second speed from the shielding area SA shielded by the non-crossing road shielding object SO3 can be calculated as the risk degree VR corresponding to the non-crossing road shielding object SO3. Accordingly, it is possible to calculate an appropriate risk degree VR according to the surrounding situation of the vehicle 1 and appropriately control the vehicle 1 based on the risk degree VR with a simple configuration.

2-2. Example of Method for Calculating RiskDegree

Next, an example of a specific method for calculating the risk degree VR will be described. The calculation unit 35 derives various parameters such as a shielding size risk S, a guard rail risk G, a lane number risk W, and a crosswalk risk C, and calculates the risk degree VR based on the derived parameters.

(Shielding Size Risk S)

First, an example of a method for deriving the shielding size risk S will be described with reference to FIGS. 3, 5, and 6. When deriving the shielding size risk S, the calculation unit 35 first derives an overlapping area ratio Sr, which is the ratio of the overlapping area OA to the processing target area PT, based on the size of the processing target area PT and the size of the overlapping area OA. The processing target area PT may be referred to as the "area to be seen originally" by the driver. The overlapping area OA in which the processing target area PT and the shielding area SA overlap each other can be referred to as an "invisible area" to the driver. Therefore, the overlapping area ratio Sr can also be referred to as the "ratio of the size of the invisible area to the size of the area to be seen originally".

Figure 5:
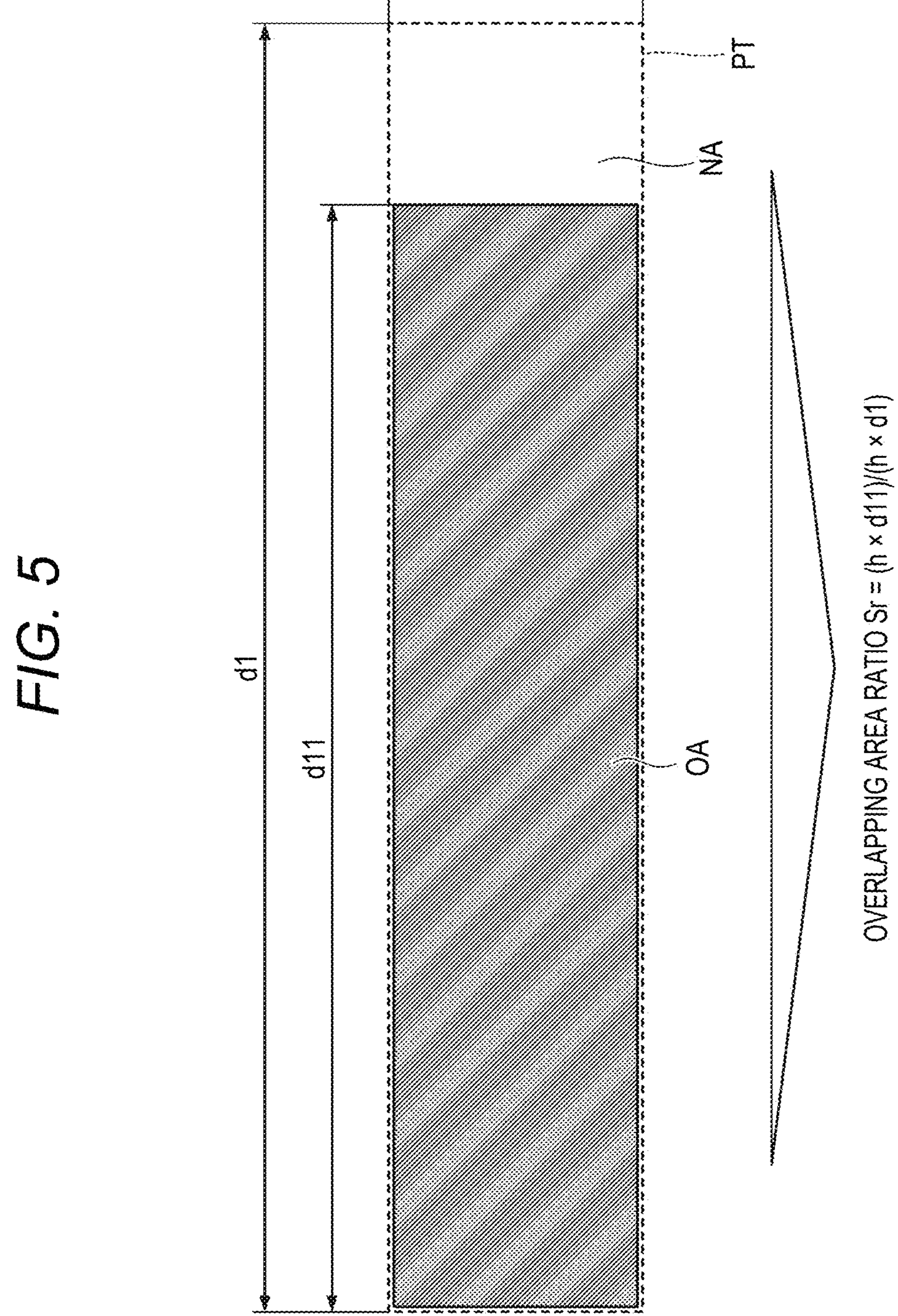
FIG. 5 is a diagram illustrating an example of a method for deriving an overlapping area ratio Sr between a processing target area PT and an overlapping area OA.

As illustrated in FIGS. 3 and 5, the size of the processing target area PT can be obtained from the product of the vertical distance h of the processing target area PT and the horizontal distance d1 of the processing target area PT. That is, the size of the processing target area PT may be referred to as the area of the processing target area PT in the front image FI.

If the overlapping area OA is rectangular as illustrated in FIGS. 3 and 5, the size of the overlapping area OA may be obtained from the product of the height of the overlapping area OA in the front image FI (in other words, the length in the upper-lower direction; hereinafter also referred to as the "vertical distance of the overlapping area OA") and the length of the overlapping area OA in the left-right direction in the front image FI (hereinafter also referred to as the "horizontal distance d11 of the overlapping area OA"). That is, the size of the overlapping area OA may be referred to as the area of the overlapping area OA in the front image FI.

Therefore, for example, the overlapping area ratio Sr can be obtained by the following formula (1), where, for example, h is the vertical distance of each of the processing target area PT and the overlapping area OA, d1 is the horizontal distance of the processing target area PT, and d11 is the horizontal distance of the overlapping area OA, as illustrated in FIGS. 3 and 5.

$$\text{Overlapping area ratio } Sr=(h\times d11)/(h\times d1) \quad (1)$$

In the example described here, the overlapping area ratio Sr is obtained from the size of the processing target area PT and the size of the overlapping area OA, but is not limited thereto. For example, the calculation unit 35 may obtain the ratio of the size of the overlapping area OA and the size of a non-overlapping area NA, which is an area excluding the overlapping area OA from the processing target area PT, as the overlapping area ratio Sr.

Figure 6:
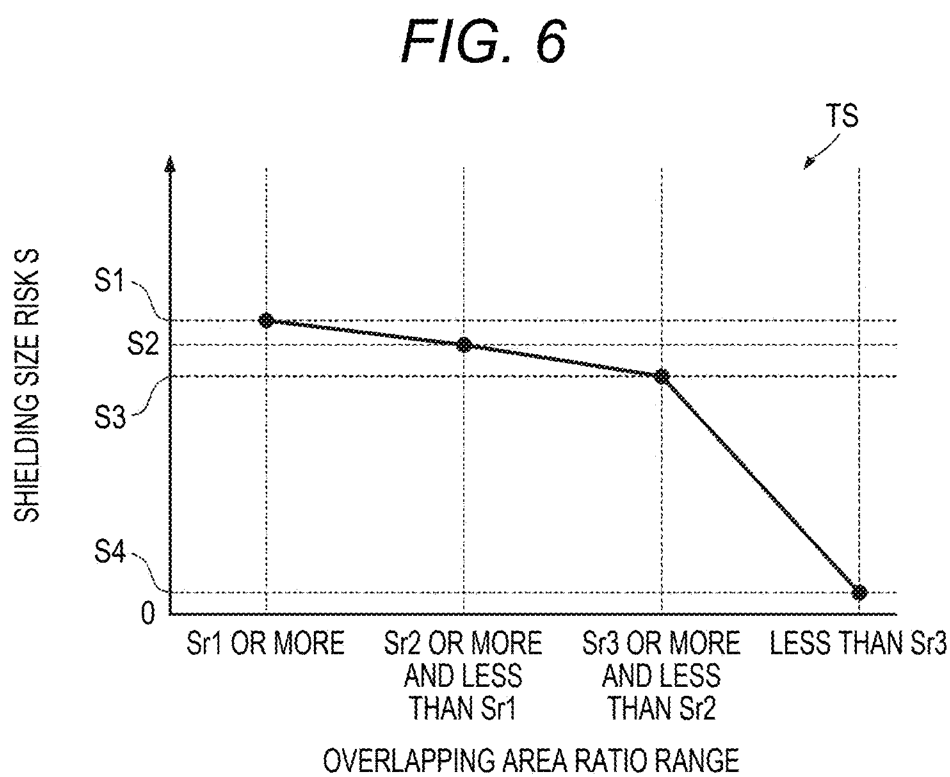
FIG. 6 is a diagram illustrating an example of a shielding size risk table TS used for deriving a shielding size risk S.

When the overlapping area ratio Sr is calculated, for example, the calculation unit 35 derives the shielding size risk S based on the calculated overlapping area ratio Sr with reference to a shielding size risk table TS illustrated in FIG. 6. Here, the shielding size risk table TS is a table (that is, information) that defines the shielding size risk S corresponding to the range of the overlapping area ratio Sr, and is stored in advance in the storage unit of the control device 30 or the like.

In the shielding size risk table TS illustrated in FIG. 6, an overlapping area ratio range "Sr1 or more" is associated with a shielding size risk S "S1", an overlapping area ratio range "Sr2 or more and less than Sr1" is associated with a shielding size risk S "S2", an overlapping area ratio range "Sr3 or more and less than Sr2" is associated with a shielding size risk S "S3", and an overlapping area ratio range "less than Sr3" is associated with a shielding size risk S "S4". Here, S1, S2, S3, and S4 are predetermined values determined in advance, and have a correlation S1>S2>S3>S4 as illustrated in FIG. 6.

For example, if the calculated overlapping area ratio Sr is determined as the value "Sr1 or more", the calculation unit 35 refers to the shielding size risk table TS and derives "S1" corresponding to the overlapping area ratio range "Sr1 or more" as the shielding size risk S. For example, if the calculated overlapping area ratio Sr is determined as the value "Sr2 or more and less than Sr1", the calculation unit 35 refers to the shielding size risk table TS and derives "S2" corresponding to the overlapping area ratio range "Sr2 or more and less than Sr1" as the shielding size risk S.

If the crossing road shielding object SO1 as illustrated in FIG. 2 is present, the horizontal distance d1 of the processing target area PT is larger than the case where the connecting road shielding object SO2 is present or the case where the non-crossing road shielding object SO3 is present as illustrated in FIG. 4, and thus the derived shielding size risk S also tends to be large.

(Guard Rail Risk G)

Next, an example of a method for deriving the guard rail risk G will be described. The calculation unit 35 derives the guard rail risk G based on the recognition result of the first recognition unit 31 with reference to a guard rail risk table TG illustrated in FIG. 7, for example. Here, the guard rail risk table TG is a table (that is, information) that defines the guard rail risk G corresponding to the guard rail installation condition, and is stored in advance in the storage unit of the control device 30 or the like.

Figure 7:
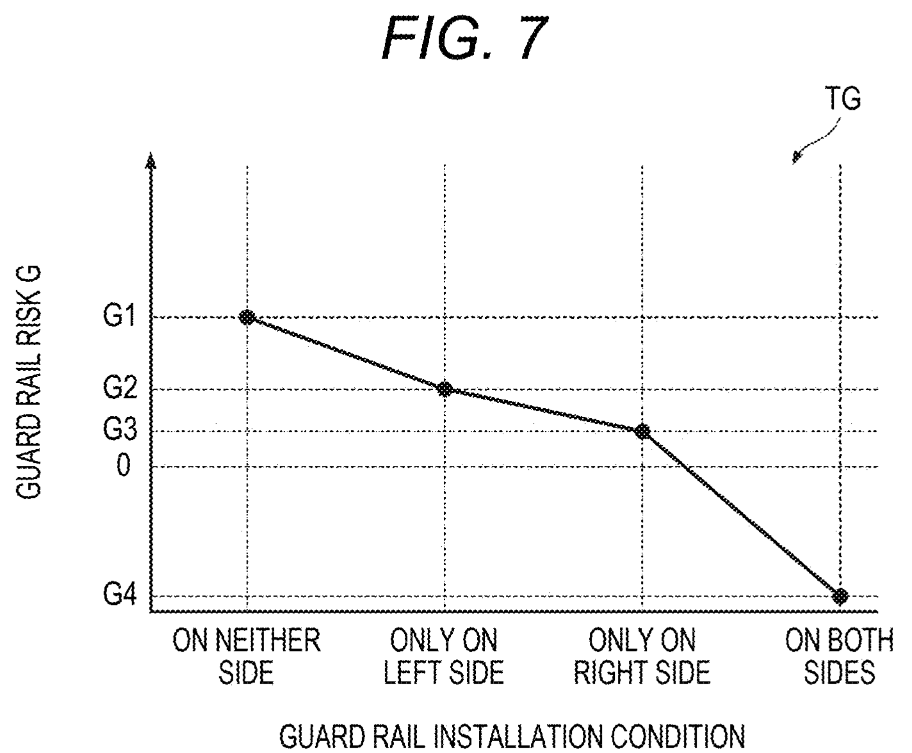
FIG. 7 is a diagram illustrating an example of a guard rail risk table TG used for deriving a guard rail risk G.

In the guard rail risk table TG illustrated in FIG. 7, a guard rail installation condition "on neither side" is associated with a guard rail risk G "G1", a guard rail installation condition "only on left side" is associated with a guard rail risk G "G2", a guard rail installation condition "only on right side" is associated with a guard rail risk G "G3", and a guard rail installation condition "on both sides" is associated with a guard rail risk G "G4". Here, G1, G2, G3, and G4 are predetermined values that are determined in advance, and have a correlation G1<G2<G3<G4 as illustrated in FIG. 7.

For example, if it is determined that guard rails present on neither side of the travel path RD based on the recognition result of the first recognition unit 31, the calculation unit 35 derives "G1" corresponding to the guard rail installation condition "on neither side" as the guard rail risk G with reference to the guard rail risk table TG. Alternatively, for example, if it is determined that a guard rail is present on only the left side of the travel path RD based on the recognition result of the first recognition unit 31, the calculation unit 35 derives "G2" corresponding to the guard rail installation condition "only on left side" as the guard rail risk G with reference to the guard rail risk table TG.

According to the guard rail risk table TG as illustrated in FIG. 7, if the guard rail installation condition is "on neither side", it is possible to derive the maximum value as the guard rail risk G. Further, if the guard rail installation condition is "on both sides", it is possible to derive the minimum value as the guard rail risk G. This is in consideration that, in a road provided with a structure for preventing entry into the road such as a guard rail, moving objects that unexpectedly enter the road such as pedestrians are less than a road without being provided with such a structure.

Further, according to the guard rail risk table TG as illustrated in FIG. 7, if the guard rail installation condition is "only on right side", it is possible to derive a value smaller than the case where the guard rail installation condition is "only on left side" as the guard rail risk G. This is in consideration that, on the assumption of left-hand traffic, if the guard rail is installed on the side farther from the vehicle 1 (that is, the right side), the distance between the vehicle 1 and the moving object crossing the guard rail and entering the road such as a pedestrian is more distant than the case where the guard rail is installed on the side closer to the vehicle 1 (that is, the left side), and thus is less likely to immediately collide with the vehicle 1.

(Lane Number Risk W)

Next, an example of a method for deriving the lane number risk W will be described. The calculation unit 35 derives the lane number risk W based on the recognition result of the first recognition unit 31 with reference to a lane number risk table TW illustrated in FIG. 8, for example. Here, the lane number risk table TW is a table (that is, information) that defines the lane number risk W corresponding to the lane number (in other words, the road width), and is stored in advance in the storage unit of the control device 30 or the like.

Figure 8:
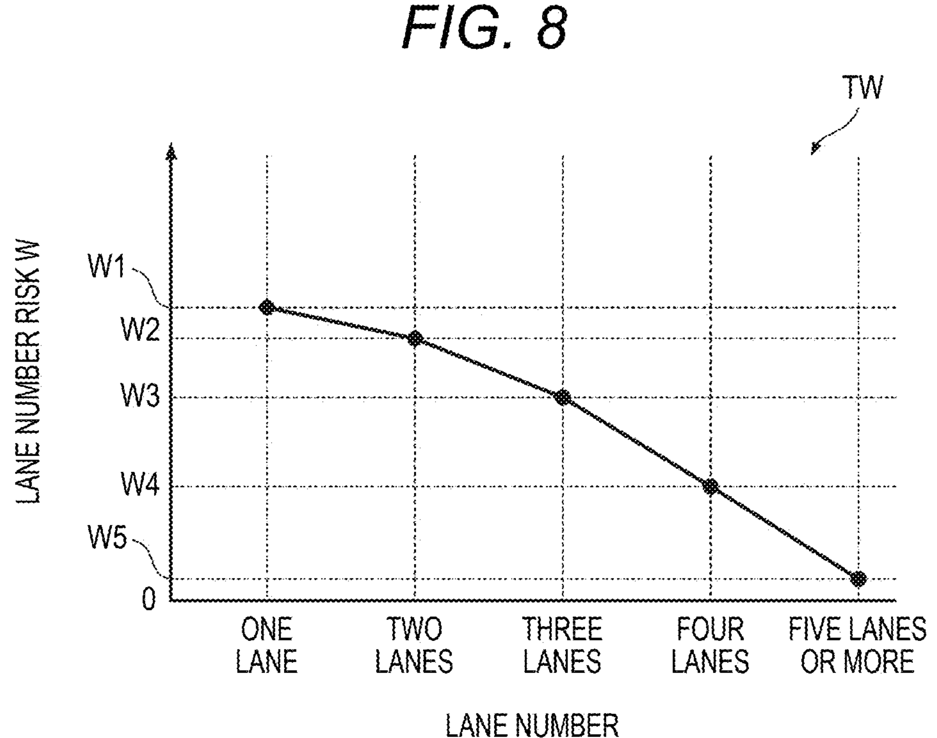
FIG. 8 is a diagram illustrating an example of a lane number risk table TW used for deriving a lane number risk.

In the lane number risk table TW illustrated in FIG. 8, a lane number "one lane" is associated with a lane number risk W "W1", a lane number "two lanes" is associated with a lane number risk W "W2", a lane number "three lanes" is associated with a lane number risk W "W3", a lane number "four lanes" is associated with a lane number risk W "W4", and a lane number "five lanes or more" is associated with a lane number risk W "W5". Here, W1, W2, W3, W4, and W5 are predetermined values that are determined in advance, and have a correlation W1>W2>W3>W4>W5 as illustrated in FIG. 8.

For example, if the lane number of the travel path RD is determined as "one lane" based on the recognition result of the first recognition unit 31, the calculation unit 35 derives "W1" corresponding to the lane number "one lane" as the lane number risk W with reference to the lane number risk table TW. For example, if the lane number of the travel path RD is determined as "two lanes" based on the recognition result of the first recognition unit 31, the calculation unit 35 derives "W2" corresponding to the lane number "two lanes" as the lane number risk W with reference to the lane number risk table TW.

According to the lane number risk table TW as illustrated in FIG. 8, a smaller value can be derived as the lane number risk W as the lane number of the travel path RD increases, in other words, as the road width of the travel path RD increases. This is in consideration that, in a road having a larger lane number (in other words, a road having a larger road width), moving objects that unexpected enter the road such as pedestrians are less than a road having a smaller lane number (in other words, a road having a smaller road width).

Here, the lane number of the travel path RD is regarded as the road width of the travel path RD, and the lane number risk W is derived corresponding to the lane number of the travel path RD, but is not limited thereto. For example, a table defining the lane number risk W corresponding to the road width (in other words, the road width risk) may be prepared instead of the lane number risk table TW, and the calculation unit 35 may derive the lane number risk W corresponding to the road width of the travel path RD recognized by the first recognition unit 31 with reference to this table.

(Crosswalk Risk C)

Next, a method for deriving the crosswalk risk C will be described with reference to FIG. 9. The calculation unit 35 derives the crosswalk risk C based on the recognition result of the first recognition unit 31 with reference to a crosswalk risk table TC illustrated in FIG. 9, for example. Here, the crosswalk risk table TC is a table defining the crosswalk risk C corresponding to the distance between the shielding object SO and the crosswalk, and is stored in advance in the storage unit of the control device 30 or the like.

Figure 9:
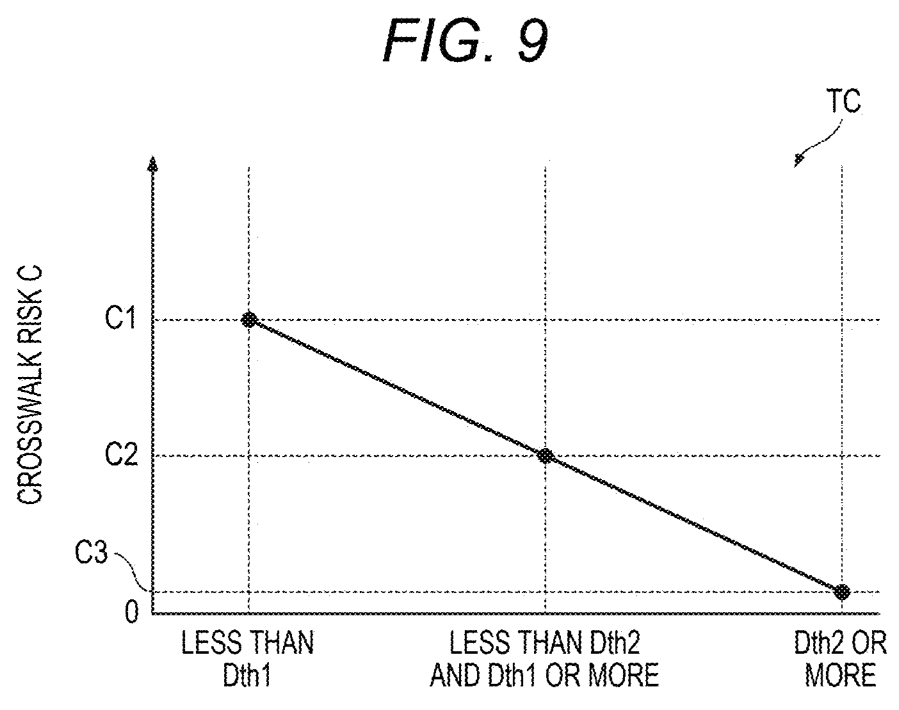
FIG. 9 is a diagram illustrating an example of a crosswalk risk table TC used for deriving a crosswalk risk C.

In the crosswalk risk table TC illustrated in FIG. 9, a distance "less than Dth1" is associated with a crosswalk risk C "C1", a distance "less than Dth1 and Dth2 or more" is associated with a crosswalk risk C "C2", and a distance "Dth2 or more" is associated with a crosswalk risk C "C3". Here, C1, C2, and C3 are predetermined values that are determined in advance, and have a correlation C1>C2>C3 as illustrated in FIG. 9.

For example, if the distance between the shielding object SO and the crosswalk closest to the shielding object SO is determines as "less than Dth1" based on the recognition result of the first recognition unit 31, the calculation unit 35 derives "C1" corresponding to the distance "less than Dth1" as the crosswalk risk C with reference to the crosswalk risk table TC. For example, if the distance between the shielding object SO and the crosswalk closest to the shielding object SO is determines as "less than Dth2 and Dth1 or more" based on the recognition result of the first recognition unit 31, the calculation unit 35 derives "C2" corresponding to the distance "less than Dth2 and Dth1 or more" as the crosswalk risk C with reference to the crosswalk risk table TC.

According to the crosswalk risk table TC illustrated in FIG. 9, a larger value can be derived as the crosswalk risk C as the distance between the shielding object SO and the crosswalk is smaller. This is in consideration that more moving objects that unexpectedly enter the road such as pedestrians are near the crosswalk.

After deriving various parameters such as the shielding size risk S, the guard rail risk G, the lane number risk W, and the crosswalk risk C for example, the calculation unit 35 calculates the risk degree VR using the following formula (2). In the following formula (2), $\alpha$ is a gain for the guard rail risk G and is a predetermined value that is set in advance. Similarly, β is a gain for the crosswalk risk C and is a predetermined value that is set in advance.

$$\text{Risk degree VR}=\text{lane number risk W}\times\text{shielding size risk S}+(\text{guard rail risk G}\times\alpha+\text{crosswalk risk C}\times\beta) \quad (2)$$

As described above, according to the calculation unit 35, it is possible to calculate the risk degree VR based on the ratio of the size of the processing target area PT or the overlapping area ratio Sr, which is the size of the non-overlapping area NA excluding the overlapping area OA from the processing target area PT, to the size of the overlapping area OA. As described above, the overlapping area ratio Sr can also be referred to as the "ratio of the size of the invisible area to the size of the area to be seen originally". Therefore, by calculating the risk degree VR based on the overlapping area ratio Sr, it is possible to calculate the risk degree VR in consideration of the "ratio of the size of the invisible area to the size of the area to be seen originally", and to calculate an appropriate risk degree VR according to the surrounding situation of the vehicle 1.

Further, according to the calculation unit 35, it is possible to calculate the risk degree VR based on the road width (for example, the lane number) of the travel path RD, and if the road width of the travel path RD is large (for example, if the lane number is large), it is possible to calculate a risk degree VR smaller than the case where the road width is small (for example, the case where the lane number is small). Accordingly, it is possible to calculate an appropriate risk degree VR in consideration of a tendency that in a road having a larger road width (for example, a road having a larger lane number), moving objects that unexpectedly enter the road such as pedestrians are less than a road having a smaller road width (for example, a road having a smaller lane number).

In addition, according to the calculation unit 35, it is possible to calculate the risk degree VR based on an object present in the vicinity of the travel path RD, and if a structure that prevents the entry into the travel path RD such as a guard rail is present as the object at a boundary between the travel path RD and the outside thereof, it is possible to calculate a risk degree VR smaller than the case where no such structures are present. Accordingly, it is possible to calculate an appropriate risk degree VR in consideration of a tendency that in a road provided with a structure for preventing entry into the road such as a guard rail, moving objects that unexpectedly enter the road such as pedestrians are less than a road without being provided with such a structure.

In addition, according to the calculation unit 35, it is possible to calculate the risk degree VR based on the crosswalk present in the vicinity of the shielding object SO, and if a crosswalk is present in the vicinity of the shielding object SO, it is possible to calculate a risk degree VR larger than the case where no crosswalks are present. Accordingly, it is possible to calculate an appropriate risk degree VR in consideration of a tendency that there are more moving objects that unexpectedly enter the road such as pedestrians in the vicinity of a crosswalk.

2-3. Example of Method for Determining Crossing Road Shielding Object

Next, an example of a method for determining the crossing road shielding object SO1 will be described. The control device 30 (for example, the second recognition unit 32) detects an edge (hereinafter, also referred to as an "edge EG") of an object present around the vehicle 1 based on a detection value of the external sensor 11, such as the radar 113 or the LiDAR. Here, the edge EG can be an outer edge in the left-right direction of the object when viewed from the vehicle 1. Then, based on the detection result of the edge EG, the control device 30 derives a shielding boundary line BL which is the boundary of the shielding area SA shielded by the object (in other words, the shielding object SO) present around the vehicle 1.

Figure 10:
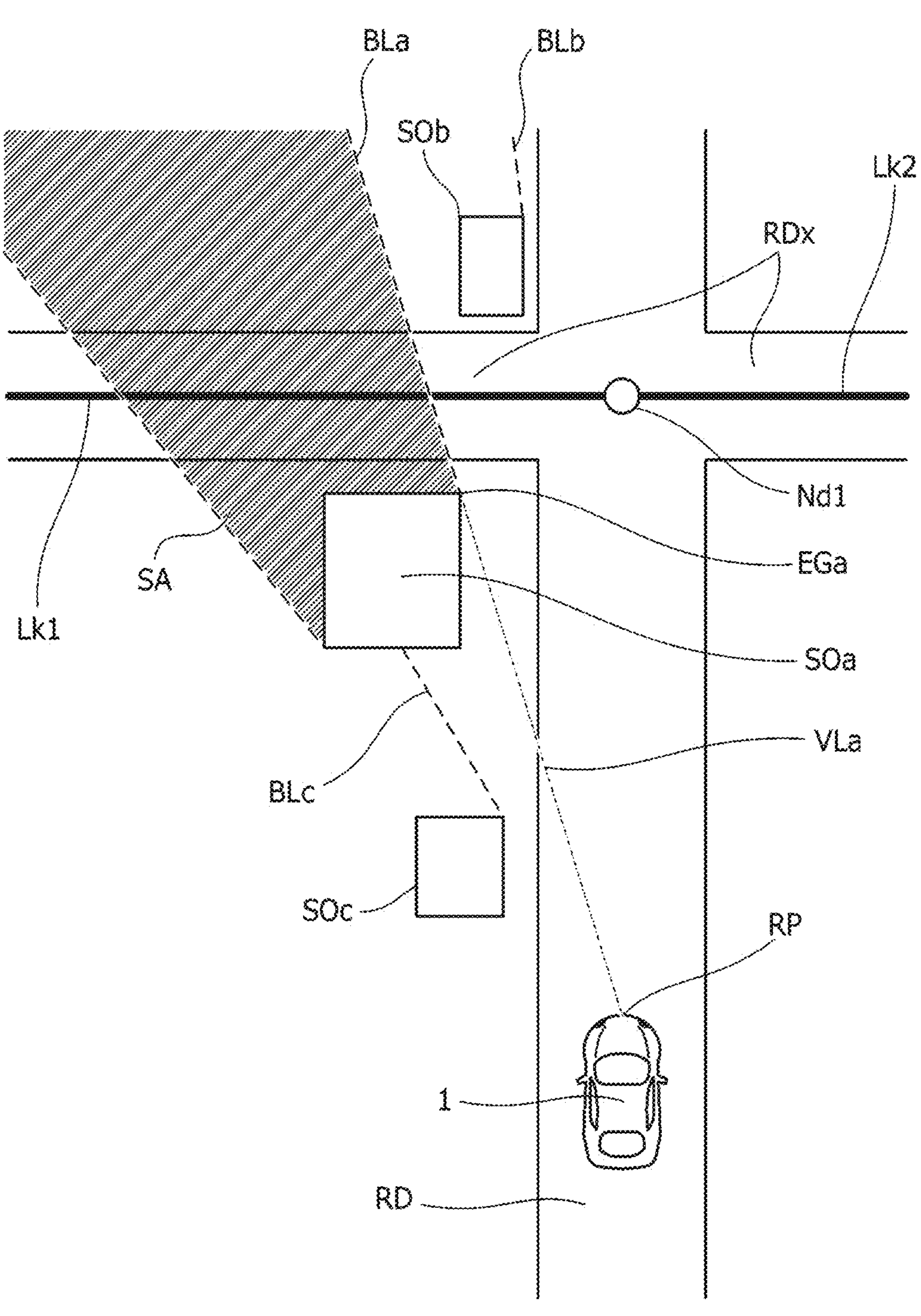
FIG. 10 is a diagram illustrating an example of a method for determining a crossing road shielding object.

For example, as illustrated in FIG. 10, it is assumed that a shielding object SOa is present on the front left side of the vehicle 1 traveling on the travel path RD. In such a case, on a virtual line VLa passing through a right side edge EGa of the shielding object SOa and a reference point RP, the control device 30 derives a portion farther than the edge EGa from the reference point RP as a shielding boundary line BLa on the right side of the shielding area SA shielded by the shielding object SOa. The reference point RP may be, for example, at the front end of the vehicle 1 and the center in the vehicle width direction, but is not limited thereto, and may be, for example, the mounting position of the radar 113.

Then, the control device 30 (for example, the determination unit 33) refers to the map information such as the map information database 24 to determine whether the derived shielding boundary line BL crosses a crossing road link, which is a link corresponding to the crossing road RDx crossing the travel path RD in front of the vehicle 1.

For example, in the example illustrated in FIG. 10, the link Lk1 and the link Lk2 are crossing road links (that is, links corresponding to the crossing road RDx), and the shielding boundary line BLa on the right side of the shielding area SA shielded by the shielding object SOa crosses the link Lk1 as a crossing road link. In such a case, the control device 30 determines the shielding object SOa as a crossing road shielding object SO1 that shields the crossing road RDx. In FIG. 10, a node Nd1 provided between the link Lk1 and the link Lk2 is a node representing the intersection between the travel path RD and the crossing road RDx.

On the other hand, for example, the shielding boundary line BL (for example, a shielding boundary line BLb) with respect to the shielding object SO that is present behind the intersection between the travel path RD and the crossing road RDx, such as the shielding object SOb illustrated in FIG. 10, does not cross the crossing road link (for example, the link Lk1 and the link Lk2). In such a case, the control device 30 determines the shielding object SOa as not the crossing road shielding object SO1 (for example, the non-crossing road shielding object SO3). In addition, for example, for a shielding object SO whose shielding boundary line BL (for example, the shielding boundary line BLc) is blocked by another shielding object SO and does not reach the crossing road link, such as shielding object SOc illustrated in FIG. 10, the control device 30 also determines the shielding object SO as not the crossing road shielding object SO1 (for example, the non-crossing road shielding object SO3).

Here, an example of a method for determining the crossing road shielding object SO1 has been described, and the connecting road shielding object SO2 can be determined similarly. That is, to determine the connecting road shielding object SO2, a connecting road link that is a link corresponding to the connecting road RDc may be used instead of the crossing road link. The determination method described here is merely an example, and the attribute of the shielding object SO may be determined using another determination method.

3. Processing Executed by Control Device

Next, an example of processing executed by the control device 30 will be described. For example, while the ignition power supply of the vehicle 1 is on, the control device 30 repeatedly executes the series of processing illustrated in the flowchart of FIG. 11 at a predetermined cycle (for example, every 5 [ms]).

Figure 11:
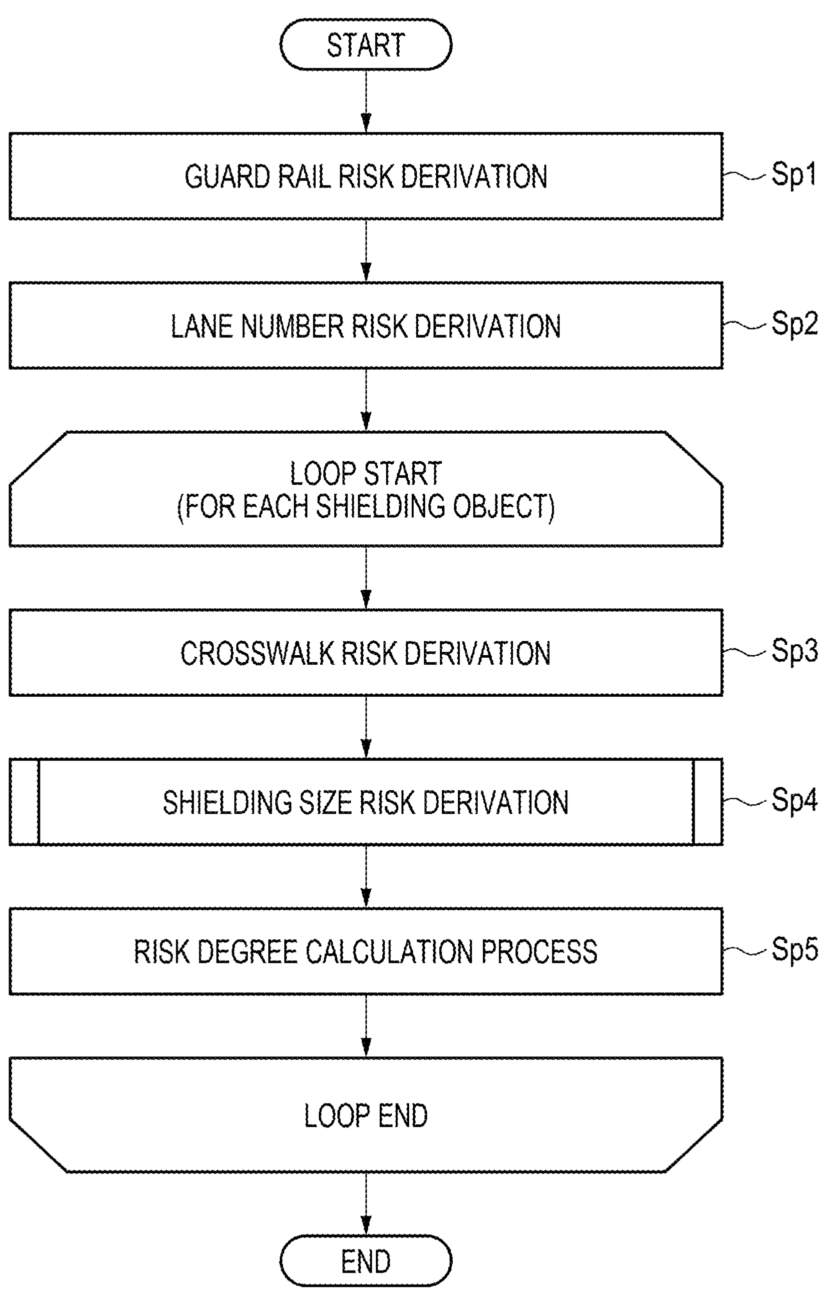
FIG. 11 is a flowchart illustrating an example of processing executed by the control device 30.

As illustrated in FIG. 11, first, the control device 30 executes guard rail risk derivation (step Sp1) for deriving the guard rail risk G and lane number risk derivation (step Sp2) for deriving the lane number risk W. Since an example of a method for deriving the guard rail risk G and the lane number risk W is described above, the description thereof will be omitted here.

Next, the control device 30 performs the processing including crosswalk risk derivation (step Sp3) for deriving the crosswalk risk C, shielding size risk derivation (step Sp4) for deriving the shielding size risk S, and risk degree calculation (step Sp5) for calculating the risk degree VR for each of the shielding objects SO detected based on the recognition result of the first recognition unit 31.

Since an example of a method for deriving the crosswalk risk C is described above, the description thereof will be omitted here. An example of the shielding size risk derivation in step Sp4 will be described later by using FIGS. 12 to 14. In the risk degree calculation processing of step Sp5, the control device 30 calculates the risk degree VR corresponding to the shielding object SO as the current processing target based on the guard rail risk G, the lane number risk W, the crosswalk risk C, and the shielding size risk S obtained as the processing results of the processing from step Sp1 to step Sp4. Thus, the control device 30 can calculate the risk degree VR corresponding to each of the shielding objects SO detected based on the recognition result of the first recognition unit 31.

(Shielding Size Risk Derivation)

Figure 13:
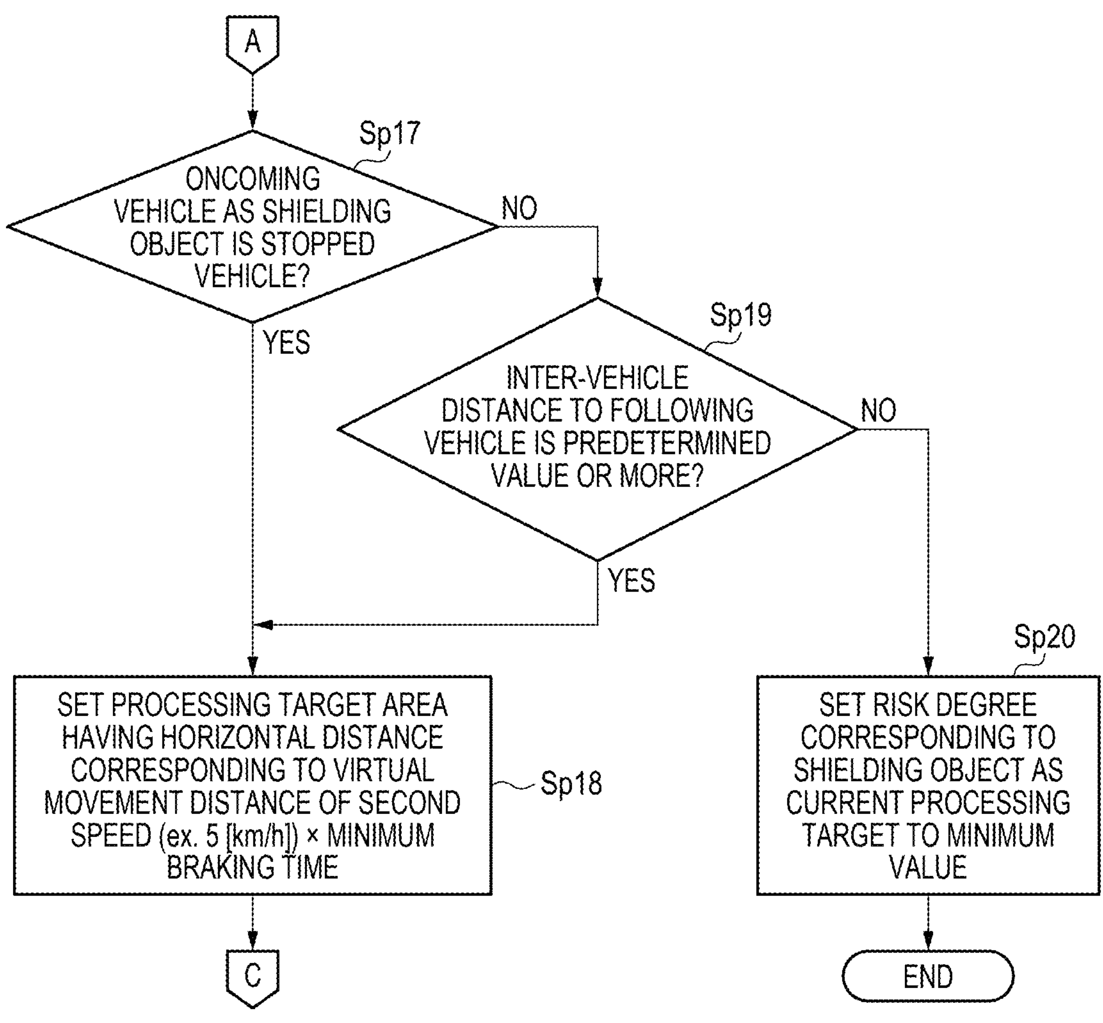
FIG. 13 is a flowchart (part 2) illustrating an example of the shielding size risk derivation illustrated in FIG. 10.
Figure 14:
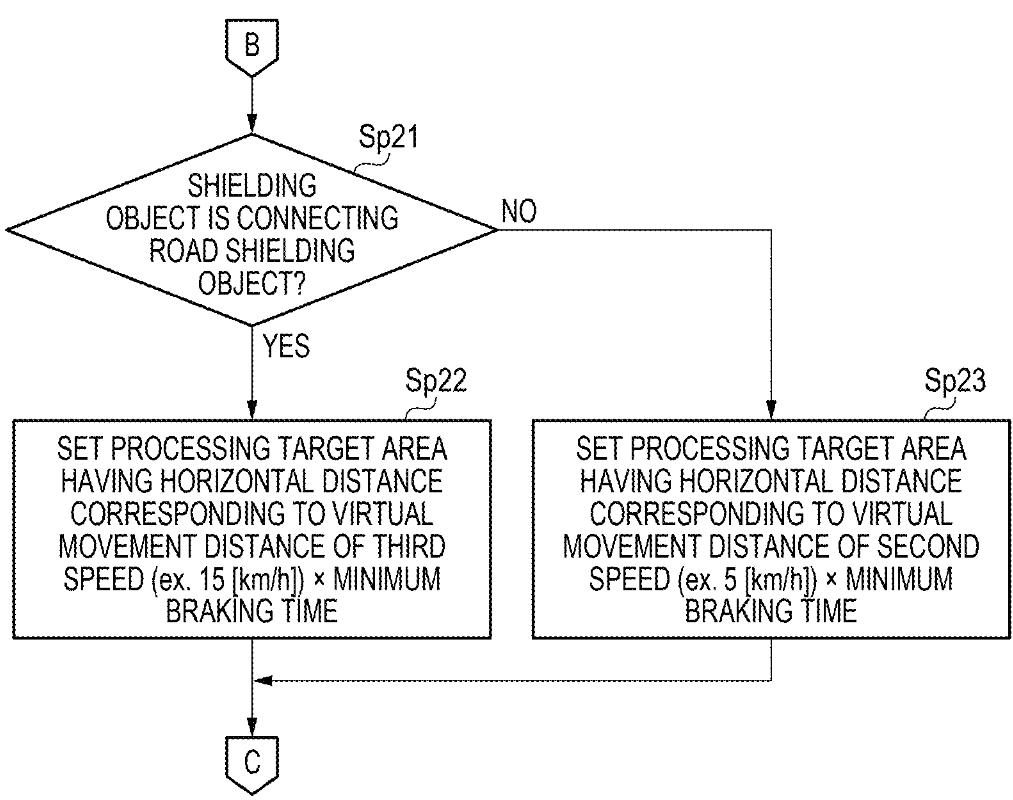
FIG. 14 is a flowchart (part 3) illustrating an example of the shielding size risk derivation illustrated in FIG. 10.

Next, an example of the shielding size risk derivation in step Sp4 will be described with reference to FIGS. 12 to 14.

Figure 12:
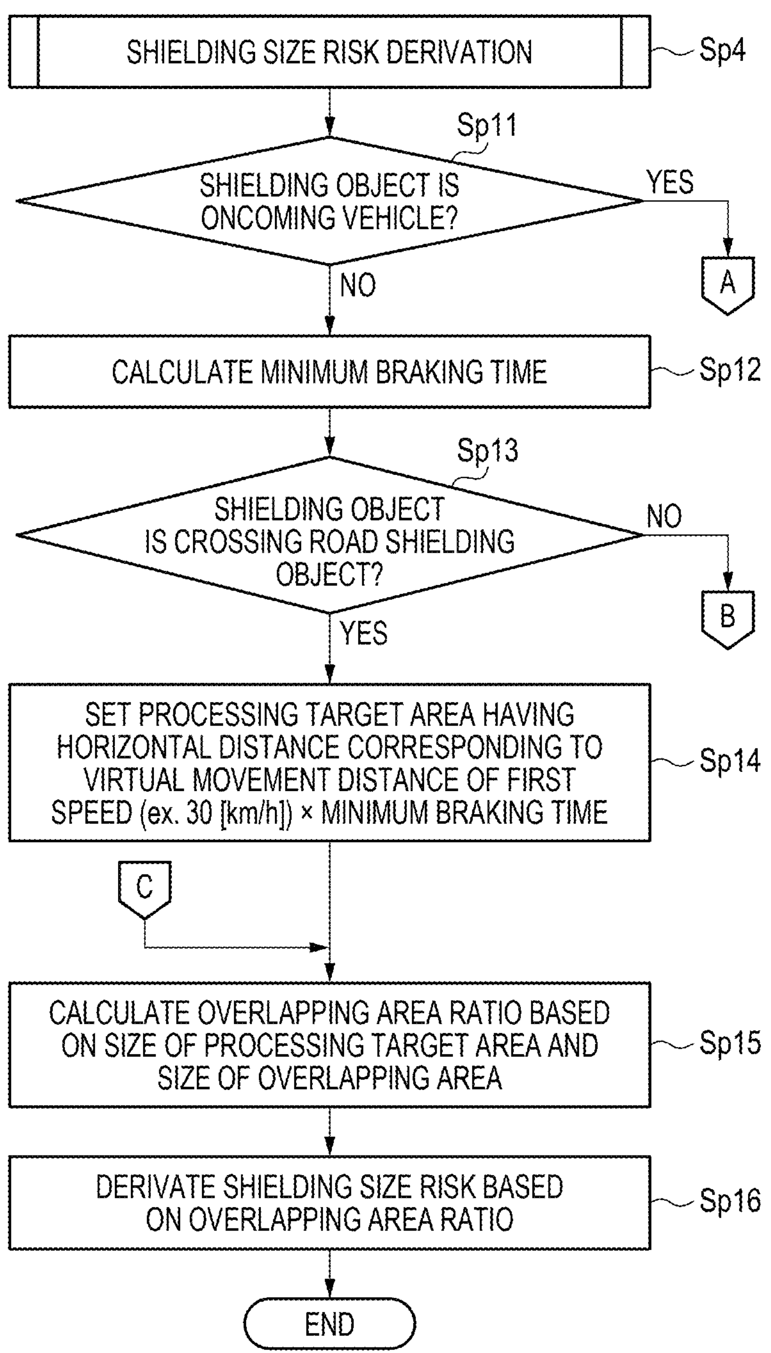
FIG. 12 is a flowchart (part 1) illustrating an example of the shielding size risk derivation illustrated in FIG. 10.

As illustrated in FIG. 12, in the shielding size risk derivation, the control device 30 first determines whether the shielding object SO as the current processing target is an oncoming vehicle (step Sp11). If it is determined that the shielding object SO as the current processing target is not an oncoming vehicle (step Sp11: NO), the control device 30 calculates the minimum braking time Tmin which is the braking time when the vehicle 1 is decelerated at the predetermined deceleration x from the current vehicle speed VP (step Sp12).

Next, the control device 30 determines whether the shielding object SO as the current processing target is the crossing road shielding object SO1 (step Sp13). If it is determined that the shielding object SO as the current processing target is the crossing road shielding object SO1 (step Sp13: YES), the control device 30 sets a processing target area PT having the horizontal distance d1 corresponding to the virtual movement distance Dv that is the product of the first speed (for example, 30 [km/h]) and the minimum braking time Tmin calculated by the processing of step Sp12 (step Sp14).

Next, the control device 30 derives the overlapping area ratio Sr based on the size of the processing target area PT set in the current shielding size risk derivation and the size of the shielding area SA on the front image FI shielded by the shielding object SO as the current processing target (step Sp15). Then, for example, with reference to the shielding size risk table TS, the control device 30 derives the shielding size risk S corresponding to the shielding object SO as the current processing target based on the overlapping area ratio Sr derived from the processing of step Sp15 (step Sp16), and ends the current shielding size risk derivation.

In the processing of step Sp11, if it is determined that the shielding object SO as the current processing target is an oncoming vehicle (step Sp11: YES), the control device 30 proceeds to the processing of step Sp17 illustrated in FIG. 13.

Then, the control device 30 determines whether the oncoming vehicle as the shielding object SO as the current processing target is a stopped vehicle (that is, the travel speed thereof is a threshold or less) (step Sp17). If it is determined that the oncoming vehicle as the shielding object SO as the current processing target is a stopped vehicle (step Sp17: YES), the control device 30 sets a processing target area PT having the horizontal distance d1 corresponding to the virtual movement distance Dv that is the product of the second speed (for example, 5 [km/h]) and the minimum braking time Tmin calculated by the processing of step Sp12 (step Sp18), and proceeds to the processing of step Sp15 illustrated in FIG. 12.

On the other hand, if it is determined that the oncoming vehicle that is the shielding object SO as the current processing target is not a stopped vehicle (step Sp17: NO), the control device 30 determines whether the inter-vehicle distance between the oncoming vehicle and the following vehicle traveling behind the oncoming vehicle is a predetermined value or more (for example, 30 [m]) (step Sp19). Here, the predetermined value can be determined freely by the manufacturer of the vehicle 1, for example.

If it is determined that the inter-vehicle distance between the oncoming vehicle as the shielding object SO as the current processing target and the vehicle following the oncoming vehicle is the predetermined value or more (step Sp19: YES), the control device 30 proceeds to the processing of step Sp18 described above, and sets a processing target area PT having the horizontal distance d1 corresponding to the second speed and the minimum braking time Tmin.

On the other hand, if it is determined that the inter-vehicle distance between the oncoming vehicle as the shielding object SO as the current processing target and the vehicle following the oncoming vehicle is less than the predetermined value (step Sp19: NO), the risk degree VR corresponding to the shielding object SO as the current processing target is set to the minimum value (step Sp20), and the current shielding size risk derivation is ended. The minimum value set by the processing of step Sp20 is determined in advance by the manufacturer of the vehicle 1, for example. If the processing of step Sp20 is performed, the control device 30 does not have to execute the processing of step Sp5 illustrated in FIG. 11 on the shielding object SO as the current processing target.

According to the processing of step Sp20, if it is assumed that the inter-vehicle distance between the oncoming vehicle as the shielding object SO and the vehicle following the oncoming vehicle is short and a moving object such as a pedestrian is less likely to enter the travel path RD from behind the oncoming vehicle, it is possible to prevent an excessively large value from being calculated as the risk degree VR corresponding to the oncoming vehicle.

In the processing of step Sp13 illustrated in FIG. 12, if it is determined that the shielding object SO as the current processing target is not the crossing road shielding object SO1 (step Sp13: NO), the control device 30 proceeds to the processing of step Sp21 illustrated in FIG. 14.

Then, the control device 30 determines whether the shielding object SO as the current processing target is the connecting road shielding object SO2 (step Sp21). If it is determined that the shielding object SO as the current processing target is the connecting road shielding object SO2 (step Sp21: YES), the control device 30 sets the processing target area PT having the horizontal distance d1 corresponding to the virtual movement distance Dv that is the product of the third speed (for example, 15 [km/h]) and the minimum braking time Tmin calculated by the processing of step Sp12 (step Sp22), and proceeds to the processing of step Sp15 illustrated in FIG. 12.

On the other hand, if it is determined that the shielding object SO as the current processing target is not the connecting road shielding object SO2 (step Sp21: NO), that is, if the shielding object SO as the current processing target is the non-crossing road shielding object SO3 other than an oncoming vehicle, the control device 30 sets the processing target area PT having the horizontal distance d1 corresponding to the virtual movement distance Dv that is the product of the second speed (for example, 5 [km/h]) and the minimum braking time Tmin calculated by the processing of step Sp12 (step Sp23), and proceeds to the processing of step Sp15 illustrated in FIG. 12.

As described above, according to the control device 30, it is possible to calculate an appropriate risk degree VR in consideration of the attribute of the shielding object SO by determining the attribute of the shielding object SO and setting the processing target area PT corresponding to the determination result. Therefore, it is possible to calculate an appropriate risk degree according to the surrounding situation of the vehicle 1.

If an oncoming vehicle, which is another vehicle oriented in a direction opposite to the direction of the vehicle 1, is recognized as the shielding object SO and the inter-vehicle distance between the oncoming vehicle and a vehicle following the oncoming vehicle is the predetermined value or less, the control device 30 can set a risk degree VR corresponding to the oncoming vehicle as the shielding object SO to a minimum value that can be set. Accordingly, if it is assumed that a moving object such as a pedestrian is less likely to enter the travel path RD from behind the oncoming vehicle as the shielding object SO, it is possible to prevent an excessively large value from being calculated as the risk degree VR corresponding to the oncoming vehicle.

The control method described in the present embodiment can be implemented by a computer executing a program (control program) prepared in advance. The control program is stored in, for example, a computer-readable storage medium and executed by being read from the storage medium. In addition, the control program may be provided in a form stored in a non-volatile (non-transitory) storage medium such as a flash memory, or may be provided via a network such as the Internet. In the present embodiment, a computer that executes the present control program is a control device 30 (for example, a processor of the control device 30), but is not limited thereto. The computer that executes the control program may be included in the vehicle 1 or may be included in the external device 2 that can communicate with the vehicle 1.

Although an embodiment of the present invention has been described above, it goes without saying that the present invention is not limited to the embodiment. It is apparent that those skilled in the art may conceive of various modifications and changes within the scope described in the claims, and it is understood that such modifications and changes naturally fall within the technical scope of the present invention.

For example, even if the crossing road shielding object SO1 is present, the control device 30 may set a processing target area PT having the horizontal distance d1 corresponding to the minimum braking time Tmin and a speed (for example, 5 [km/h]) lower than the first speed, as long as the distance from the vehicle 1 to the intersection between the crossing road RDx shielded by the crossing road shielding object SO1 and the travel path RD is equal to or greater than a predetermined value greater than the minimum braking distance Dmin. In this way, if the distance from the vehicle 1 to the intersection is larger than the predetermined value (that is, if the distance to the intersection is sufficient), it is possible to set a processing target area PT having a smaller horizontal distance d1, and to prevent an excessively large value from being calculated as the risk degree VR.

Similarly, even if the connecting road shielding object SO2 is present, the control device 30 may set the processing target area PT having the horizontal distance d1 corresponding to the minimum braking time Tmin and a speed (for example, 5 [km/h]) lower than the third speed, as long as the distance from the vehicle 1 to the connection point between the connecting road RDc shielded by the connecting road shielding object SO2 and the travel path RD is equal to or greater than a predetermined value greater than the minimum braking distance Dmin. In this way, if the distance from the vehicle 1 to the connection point is larger than the predetermined value (that is, if the distance to the connection point is sufficient), it is possible to set a processing target area PT having a smaller horizontal distance d1, and to prevent an excessively large value from being calculated as the risk degree VR.

In addition, for example, if a traffic light corresponding to the travel path RD is present at the intersection between the travel path RD and the crossing road RDx, the control device 30 may recognize the lighting state of the traffic light by the first recognition unit 31, and may calculate the risk degree VR corresponding to the crossing road shielding object SO1 that shields at least a part of the crossing road RDx in consideration of the lighting state as well. More specifically, if a traffic light corresponding to the travel path RD is present at the intersection between the travel path RD and the crossing road RDx and the lighting color of the traffic light indicates that passage is allowed, the control device 30 may set a risk degree VR corresponding to the crossing road shielding object SO1 that shields at least a part of the crossing road RDx to a minimum value that can be set. Accordingly, if it is assumed that a moving object is less likely to enter the travel path RD from the crossing road RDx, it is possible to prevent an excessively large value from being calculated as the risk degree VR corresponding to the crossing road shielding object SO1 that shields at least a part of the crossing road RDx.

In the present specification, at least the following matters are described. Although corresponding constituent elements and the like in the above embodiment are shown in parentheses, the present invention is not limited thereto.

(1) A vehicle control device (control device 30) for controlling a vehicle (vehicle 1), including:

- a first recognition unit (first recognition unit 31) configured to recognize a surrounding situation of the vehicle based on information obtained by an external sensor (external sensor 11) including a camera (camera 111) configured to image at least the front of the vehicle;
- a second recognition unit (second recognition unit 32) configured to, if a shielding object (shielding object SO) present in front of the vehicle is recognized by the first recognition unit, recognize a shielding area (shielding area SA) shielded by the shielding object;

a determination unit (determination unit 33) configured to determine an attribute of the shielding object based on a recognition result of the first recognition unit;

a setting unit (setting unit 34) configured to, based on a recognition result of the second recognition unit and a determination result of the determination unit, set the shielding area and a predetermined processing target area (processing target area PT) with respect to a front image (front image FI) of the vehicle obtained based on an imaging result of the camera;

a calculation unit (calculation unit 35) configured to calculate a risk degree (risk degree VR) corresponding to the shielding object based on a size of an overlapping area (overlapping area OA) of the shielding area and the processing target area set by the setting unit; and a vehicle control unit (vehicle control unit 36) configured to control the vehicle based on the risk degree calculated by the calculation unit, in which if the shielding object is determined as a crossing road shielding object (crossing road shielding object SO1) that shields at least a part of a crossing road (crossing road RDx) that is a road crossing a travel path (travel path RD) on which the vehicle travels in front of the vehicle, the setting unit sets as the processing target area, in the front image, an area extending toward the crossing road shielding object along a first direction corresponding to a width direction of the vehicle with reference to a virtual collision point (virtual collision point CP) between the vehicle and a moving object (virtual moving object VM) that may enter the travel path at a first speed from the crossing road on a side closer to the crossing road shielding object, and sets a length of the processing target area in the first direction (horizontal distance d1 of the processing target area) to a length corresponding to a distance corresponding to the first speed and a braking time when the vehicle is decelerated at a predetermined deceleration.

According to (1), it is possible to calculate an appropriate risk degree according to the surrounding situation of the host vehicle on the assumption that the risk degree corresponding to the shielding object present in front of the host vehicle is calculated using the front image of the host vehicle. Specifically, if a crossing road shielding object that shields at least a part of the crossing road that crosses the travel path on which the host vehicle is traveling in front of the host vehicle is present in front of the host vehicle, a risk degree in consideration of a moving object that may enter the travel path at the first speed from the crossing road shielded by the crossing road shielding object can be calculated as the risk degree corresponding to the crossing road shielding object. Therefore, it is possible to calculate an appropriate risk degree according to the surrounding situation of the vehicle and appropriately control the vehicle based on the risk degree with a simple configuration. Further, this can contribute to development of a sustainable transportation system.

(2) The vehicle control device according to (1), in which if the shielding object is determined as a non-crossing road shielding object (non-crossing road shielding object SO3) different from the crossing road shielding object, the setting unit sets as the processing target area, in the front image, an area extending toward the non-crossing road shielding object along the first direction with reference to a virtual collision point between the vehicle and a moving object that may enter the travel path at a second speed lower than the first speed from the shielding area shielded by the non-crossing road shielding object, and sets the length of the processing target area in the first direction to a length corresponding to a distance corresponding to the second speed and the braking time.

According to (2), if a non-crossing road shielding object is present in front of the host vehicle, a risk degree in consideration of a moving object that may enter the travel path at the second speed from the shielding area by the non-crossing road shielding object can be calculated as the risk degree corresponding to the non-crossing road shielding object.

(3) The vehicle control device according to (1) or (2), in which if the shielding object is determined as a connecting road shielding object (connecting road shielding object SO2) that shields at least a part of a connecting road (connecting road RDc) that is a road connected to the travel path in front of the vehicle, the setting unit sets as the processing target area, in the front image, an area extending toward the connecting road shielding object along the first direction with reference to a virtual collision point (virtual collision point CP) between the vehicle and a moving object (virtual moving object VM) that may enter the travel path at a third speed lower than the first speed from the connecting road, and sets the length of the processing target area in the first direction to a length corresponding to a distance corresponding to the third speed and the braking time.

According to (3), if a connecting road shielding object that shields at least a part of a connecting road that is a road connected to the travel path in front of the host vehicle is present in front of the host vehicle, a risk degree in consideration of a moving object that may enter the travel path at the third speed from the connecting road shielded by the connecting road shielding object can be calculated as the risk degree corresponding to the connecting road shielding object.

(4) The vehicle control device according to any one of (1) to (3), in which the determination unit is configured to refer to map information (map information database 24), and determines the attribute of the shielding object based on the recognition result of the first recognition unit and the map information.

According to (4), the attribute of the shielding object can be determined more accurately than the case where the attribute of the shielding object is determined based on only the recognition result of the first recognition unit.

(5) The vehicle control device according to any one of (1) to (4), in which the setting unit sets the processing target area extending in the first direction and having a predetermined height (height h) in a second direction corresponding to an upper-lower direction of the vehicle.

According to (5), it is possible to simplify the setting of the processing target area and reduce the processing load when setting the processing target area.

(6) The vehicle control device according to any one of (1) to (5), in which the calculation unit calculates the risk degree based on a ratio of a size of the processing target area or a size of an area (non-overlapping area NA) excluding the overlapping area from the processing target area to a size of the overlapping area.

According to (6), it is possible to calculate an appropriate risk degree according to the surrounding situation of the vehicle using a front image of the host vehicle.

(7) The vehicle control device according to any one of (1) to (6), in which the calculation unit calculates the risk degree based on a road width of the travel path, and if the road width is large, calculates the risk degree smaller than a case where the road width is small.

According to (7), it is possible to calculate an appropriate risk degree in consideration of a tendency that in a road having a larger road width (for example, a road having a larger lane number), moving objects that unexpectedly enter the road such as pedestrians are less than a road having a smaller road width (for example, a road having a smaller lane number).

(8) The vehicle control device according to any one of (1) to (7), in which the calculation unit calculates the risk degree based on an object present in the vicinity of the travel path, and if a structure that prevents entry into the travel path is present as the object on a boundary between the travel path and the outside of the travel path, calculates the risk degree smaller than a case where the structure is not present.

According to (8), it is possible to calculate an appropriate risk degree in consideration of a tendency that in a road provided with a structure for preventing entry into the road such as a guard rail, moving objects that unexpectedly enter the road such as pedestrians are less than a road without being provided with such a structure.

(9) The vehicle control device according to any one of (1) to (8), in which the calculation unit calculates the risk degree based on a crosswalk present in the vicinity of the shielding object, and if the crosswalk is present in the vicinity of the shielding object, calculates the risk degree larger than a case where the crosswalk is not present.

According to (9), it is possible to calculate an appropriate risk degree in consideration of a tendency that there are more moving objects that unexpectedly enter the road such as pedestrians in the vicinity of a crosswalk.

(10) The vehicle control device according to any one of (1) to (9), in which if another vehicle oriented in a direction opposite to the vehicle is recognized as the shielding object and an inter-vehicle distance between said another vehicle and a vehicle following said another vehicle is a predetermined value or less, the vehicle control device sets the risk degree corresponding to said another vehicle as the shielding object to a minimum value that can be set.

According to (10), if it is assumed that the inter-vehicle distance between another vehicle as the shielding object and the vehicle following the other vehicle is short and a moving object such as a pedestrian is less likely to enter the travel path from behind the other vehicle, it is possible to prevent an excessively large value from being calculated as the risk degree corresponding to the other vehicle.

(11) The vehicle control device according to any one of (1) to (10), in which if a traffic light corresponding to the travel path is present at an intersection between the travel path and the crossing road and a lighting color of the traffic light indicates that passage is allowed, the vehicle control device sets the risk degree corresponding to the crossing road shielding object to a minimum value that can be set.

According to (11), if it is assumed that a moving object is less likely to enter the travel path from the crossing road, it is possible to prevent an excessively large value from being calculated as the risk degree corresponding to the crossing road shielding object that shields at least a part of the crossing road.

(12) A control method of a computer (control device 30) for controlling a vehicle (vehicle 1) performing processing including:

recognizing a surrounding situation of the vehicle based on information obtained by an external sensor (external sensor 11) including a camera (camera 111) configured to image at least the front of the vehicle;

if a shielding object (shielding object SO) present in front of the vehicle is recognized, recognizing a shielding area (shielding area SA) shielded by the shielding object;

determining an attribute of the shielding object based on a recognition result of the surrounding situation;

based on a recognition result of the shielding area and a determination result of the attribute of the shielding object, setting the shielding area and a predetermined processing target area with respect to a front image (front image FI) of the vehicle obtained based on an imaging result of the camera;

calculating a risk degree (risk degree VR) corresponding to the shielding object based on a size of an overlapping area of the shielding area and the processing target area which had been set; and controlling the vehicle based on the risk degree, in which the processing of setting the processing target area includes: if the shielding object is determined as a crossing road shielding object (crossing road shielding object SO1) that shields at least a part of a crossing road (crossing road RDx) that is a road crossing a travel path (travel path RD) on which the vehicle travels in front of the vehicle, setting as the processing target area, in the front image, an area extending toward the crossing road shielding object along a first direction corresponding to a width direction of the vehicle with reference to a virtual collision point (virtual collision point CP) between the vehicle and a moving object (virtual moving object VM) that may enter the travel path at a first speed from the crossing road on a side closer to the crossing road shielding object, and setting a length of the processing target area in the first direction (horizontal distance d1 of the processing target area) to a length corresponding to a distance corresponding to the first speed and a braking time when the vehicle is decelerated at a predetermined deceleration.

According to (12), it is possible to calculate an appropriate risk degree according to the surrounding situation of the host vehicle on the assumption that the risk degree corresponding to the shielding object present in front of the host vehicle is calculated using the front image of the host vehicle. Specifically, if a crossing road shielding object that shields at least a part of the crossing road that crosses the travel path on which the host vehicle is traveling in front of the host vehicle is present in front of the host vehicle, a risk degree in consideration of a moving object that may enter the travel path at the first speed from the crossing road shielded by the crossing road shielding object can be calculated as the risk degree corresponding to the crossing road shielding object. Accordingly, it is possible to calculate an appropriate risk degree according to the surrounding situation of the vehicle and appropriately control the vehicle based on the risk degree with a simple configuration. Further, this can contribute to development of a sustainable transportation system.

(13) A control program for causing a computer (control device 30) for controlling a vehicle (vehicle 1) to perform processing including:

recognizing a surrounding situation of the vehicle based on information obtained by an external sensor (external sensor 11) including a camera (camera 111) configured to image at least the front of the vehicle;

if a shielding object (shielding object SO) present in front of the vehicle is recognized, recognizing a shielding area (shielding area SA) shielded by the shielding object;

determining an attribute of the shielding object based on a recognition result of the surrounding situation;

based on a recognition result of the shielding area and a determination result of the attribute of the shielding object, setting the shielding area and a predetermined processing target area (processing target area PT) with respect to a front image (front image FI) of the vehicle obtained based on an imaging result of the camera;

calculating a risk degree (risk degree VR) corresponding to the shielding object based on a size of an overlapping area of the shielding area and the processing target area which had been set; and controlling the vehicle based on the risk degree, in which the processing of setting the processing target area includes: if the shielding object is determined as a crossing road shielding object (crossing road shielding object SO1) that shields at least a part of a crossing road (crossing road RDx) that is a road crossing a travel path (travel path RD) on which the vehicle travels in front of the vehicle, setting as the processing target area, in the front image, an area extending toward the crossing road shielding object along a first direction corresponding to a width direction of the vehicle with reference to a virtual collision point (virtual collision point CP) between the vehicle and a moving object (virtual moving object VM) that may enter the travel path at a first speed from the crossing road on a side closer to the crossing road shielding object, and setting a length of the processing target area in the first direction (horizontal distance d1 of the processing target area) to a length corresponding to a distance corresponding to the first speed and a braking time when the vehicle is decelerated at a predetermined deceleration.

According to (13), it is possible to calculate an appropriate risk degree according to the surrounding situation of the host vehicle on the assumption that the risk degree corresponding to the shielding object present in front of the host vehicle is calculated using the front image of the host vehicle. Specifically, if a crossing road shielding object that shields at least a part of the crossing road that crosses the travel path on which the host vehicle is traveling in front of the host vehicle is present in front of the host vehicle, a risk degree in consideration of a moving object that may enter the travel path at the first speed from the crossing road shielded by the crossing road shielding object can be calculated as the risk degree corresponding to the crossing road shielding object. Accordingly, it is possible to calculate an appropriate risk degree according to the surrounding situation of the vehicle and appropriately control the vehicle based on the risk degree with a simple configuration. Further, this can contribute to development of a sustainable transportation system.

REFERENCE SIGNS LIST

1 vehicle
30 control device (vehicle control device)
11 external sensor
31 first recognition unit
32 second recognition unit
33 determination unit
34 setting unit
35 calculation unit
36 vehicle control unit
111 camera
CP virtual collision point
d1 horizontal distance of processing target area
FI front image
h height of processing target area
NA non-overlapping area
OA overlapping area
PT processing target area
RD travel path
RDx crossing road
SA shielding area
SO shielding object
SO1 crossing road shielding object
SO2 connecting road shielding object
VM virtual moving object

What is claimed is:

1. A vehicle control device for controlling a vehicle, comprising:

a first recognition unit configured to recognize a surrounding situation of the vehicle based on information obtained by an external sensor including a camera configured to image at least a front of the vehicle;

a second recognition unit configured to, in a case where a shielding object present in front of the vehicle is recognized by the first recognition unit, recognize a shielding area shielded by the shielding object;

a determination unit configured to determine an attribute of the shielding object based on a recognition result of the first recognition unit;

a setting unit configured to, based on a recognition result of the second recognition unit and a determination result of the determination unit, set the shielding area and a predetermined processing target area to a front image of the vehicle obtained based on an imaging result of the camera;

a calculation unit configured to calculate a risk degree corresponding to the shielding object based on a size of an overlapping area between the shielding area and the processing target area set by the setting unit; and a vehicle control unit configured to control the vehicle based on the risk degree calculated by the calculation unit, wherein the setting unit is configured to, in a case where the shielding object is determined as a crossing road shielding object that shields at least a part of a crossing road that is a road crossing a travel path on which the vehicle travels in front of the vehicle, set, as the processing target area, in the front image, an area extending toward the crossing road shielding object along a first direction corresponding to a width direction of the vehicle with reference to a virtual collision point between the vehicle and a moving object that may enter the travel path at a first speed from the crossing road on a side closer to the crossing road shielding object, and set a length of the processing target area in the first direction to a length corresponding to a distance corresponding to the first speed and a braking time in a case where the vehicle is decelerated at a predetermined deceleration.

2. The vehicle control device according to claim 1, wherein the setting unit is configured to, in a case where the shielding object is determined as a non-crossing road shielding object different from the crossing road shielding object, set, as the processing target area, in the front image, an area extending toward the non-crossing road shielding object along the first direction with reference to a virtual collision point between the vehicle and a moving object that may enter the travel path at a second speed lower than the first speed from the shielding area shielded by the non-crossing road shielding object, and set the length of the processing target area in the first direction to a length corresponding to a distance corresponding to the second speed and the braking time.

3. The vehicle control device according to claim 1, wherein the setting unit is configured to, in a case where the shielding object is determined as a connecting road shielding object that shields at least a part of a connecting road that is a road connected to the travel path in front of the vehicle, set, as the processing target area, in the front image, an area extending toward the connecting road shielding object along the first direction with reference to a virtual collision point between the vehicle and a moving object that may enter the travel path at a third speed lower than the first speed from the connecting road, and set the length of the processing target area in the first direction to a length corresponding to a distance corresponding to the third speed and the braking time.

4. The vehicle control device according to claim 1, wherein the determination unit is configured to refer to map information, and is configured to determine the attribute of the shielding object based on the recognition result of the first recognition unit and the map information.

5. The vehicle control device according to claim 1, wherein the setting unit is configured to set the processing target area extending in the first direction and having a predetermined height in a second direction corresponding to an upper-lower direction of the vehicle.

6. The vehicle control device according to claim 1, wherein the calculation unit is configured to calculate the risk degree based on a ratio of a size of the processing target area or a size of an area excluding the overlapping area from the processing target area to a size of the overlapping area.

7. The vehicle control device according to claim 1, wherein the calculation unit is configured to calculate the risk degree based on a road width of the travel path, and in a case where the road width is larger, calculate the risk degree smaller than a case where the road width is smaller.

8. The vehicle control device according to claim 1, wherein the calculation unit is configured to calculate the risk degree based on an object present in a vicinity of the travel path, and in a case where a structure that prevents entry into the travel path is present as the object at a boundary between the travel path and an outside of the travel path, calculate the risk degree smaller than a case where the structure is not present.

9. The vehicle control device according to claim 1, wherein the calculation unit is configured to calculate the risk degree based on a crosswalk present in a vicinity of the shielding object, and in a case where the crosswalk is present in the vicinity of the shielding object, calculate the risk degree larger than a case where the crosswalk is not present.

10. The vehicle control device according to claim 1, wherein the vehicle control device is configured to, in a case where another vehicle oriented in a direction opposite to the vehicle is recognized as the shielding object and an inter-vehicle distance between the another vehicle and a vehicle following the another vehicle is a predetermined value or less, set the risk degree corresponding to the another vehicle as the shielding object to a minimum value in a range that can be set.

11. The vehicle control device according to claim 1, wherein the vehicle control device is configured to, in a case where a traffic light corresponding to the travel path is present at an intersection between the travel path and the crossing road and a lighting color of the traffic light indicates that passage is allowed, set the risk degree corresponding to the crossing road shielding object to a minimum value in a range that can be set.

12. A control method of a computer for controlling a vehicle performing processing comprising:

recognizing a surrounding situation of the vehicle based on information obtained by an external sensor including a camera configured to image at least a front of the vehicle;

in a case where a shielding object present in front of the vehicle is recognized, recognizing a shielding area shielded by the shielding object;

determining an attribute of the shielding object based on a recognition result of the surrounding situation;

based on a recognition result of the shielding area and a determination result of the attribute of the shielding object, setting the shielding area and a predetermined processing target area to a front image of the vehicle obtained based on an imaging result of the camera;

calculating a risk degree corresponding to the shielding object based on a size of an overlapping area between the shielding area and the processing target area which had been set; and controlling the vehicle based on the risk degree, wherein the setting of the processing target area comprises: in a case where the shielding object is determined as a crossing road shielding object that shields at least a part of a crossing road that is a road crossing a travel path on which the vehicle travels in front of the vehicle, setting, as the processing target area, in the front image, an area extending toward the crossing road shielding object along a first direction corresponding to a width direction of the vehicle with reference to a virtual collision point between the vehicle and a moving object that may enter the travel path at a first speed from the crossing road on a side closer to the crossing road shielding object; and setting a length of the processing target area in the first direction to a length corresponding to a distance corresponding to the first speed and a braking time in a case where the vehicle is decelerated at a predetermined deceleration.

13. A non-transitory computer readable medium storing a control program for causing a computer for controlling a vehicle to perform processing comprising:

recognizing a surrounding situation of the vehicle based on information obtained by an external sensor including a camera configured to image at least a front of the vehicle;

in a case where a shielding object present in front of the vehicle is recognized, recognizing a shielding area shielded by the shielding object;

determining an attribute of the shielding object based on a recognition result of the surrounding situation;

based on a recognition result of the shielding area and a determination result of the attribute of the shielding object, setting the shielding area and a predetermined processing target area to a front image of the vehicle obtained based on an imaging result of the camera;

calculating a risk degree corresponding to the shielding object based on a size of an overlapping area between the shielding area and the processing target area which had been set; and controlling the vehicle based on the risk degree, wherein the setting of the processing target area comprises: in a case where the shielding object is determined as a crossing road shielding object that shields at least a part of a crossing road that is a road crossing a travel path on which the vehicle travels in front of the vehicle, setting, as the processing target area, in the front image, an area extending toward the crossing road shielding object along a first direction corresponding to a width direction of the vehicle with reference to a virtual collision point between the vehicle and a moving object that may enter the travel path at a first speed from the crossing road on a side closer to the crossing road shielding object, and setting a length of the processing target area in the first direction to a length corresponding to a distance corresponding to the first speed and a braking time in a case where the vehicle is decelerated at a predetermined deceleration.

* * * * *